United States Patent [19]

Ubhayakar et al.

[11] Patent Number: 4,964,062
[45] Date of Patent: Oct. 16, 1990

[54] ROBOTIC ARM SYSTEMS

[76] Inventors: Shivadev K. Ubhayakar, 28325 Hazelridge Dr., Rancho Palos Verdes, Calif. 90274; Robert D. Baker, 28105 Golden Meadow Dr., Rancho Palos Verdes, Calif. 90472

[21] Appl. No.: 156,388

[22] Filed: Feb. 16, 1988

[51] Int. Cl.[5] .......................... B25J 17/00; B25J 18/00
[52] U.S. Cl. ................................... 364/513; 244/159; 414/1; 401/31; 401/39
[58] Field of Search ....................... 414/1; 901/31, 39; 364/513; 244/159

[56] References Cited

U.S. PATENT DOCUMENTS

| | | | |
|---|---|---|---|
| 3,520,496 | 7/1970 | Wuenscher | 901/31 |
| 3,712,481 | 1/1973 | Harwood | 901/39 |
| 3,968,885 | 7/1976 | Hassan et al. | 901/39 |
| 4,350,381 | 9/1982 | Hellmann | 901/39 |
| 4,351,553 | 9/1982 | Rovetta et al. | 901/39 |
| 4,367,891 | 1/1983 | Wauer et al. | 901/39 |
| 4,626,013 | 12/1986 | Barrows | 901/39 |

Primary Examiner—Allen MacDonald
Attorney, Agent, or Firm—Ronald M. Goldman; Ronald L. Taylor

[57] ABSTRACT

A multisection flexible multidigit arm contains hands at each end, each of which hands contains a set of fingers, suitably three, which are similarly formed flexible multidigit arms constructed to a smaller scale. Each hand contains connectors for coupling the hand to a mating connector mounted on an associated structure to provide appropriate power and control signals to the arm. One hand may grip the connector and the other hand is free to move to various positions and perform various tasks. In an additional aspect the arm may move to different locations by somersaulting between spaced connectors in the system. In an assembly system the robotic arms are used to construct frames or other assemblies.

A completely self contained arm includes a self contained source of power. Radio communication means are provided to allow electronic interaction with the arm from a remote location. In an additional aspect the self contained circuitry includes processor means programmed to control the arm to perform a certain task, relieving the operator at the remote location from specifying the details.

Control signals to the sections of the arm in an additional aspect to the disclosed invention are provided by an electrical system that uses only a few wires by multiplexing the signals and the actuators, effectively "time sharing" the electrical leads between the large number of actuators.

22 Claims, 14 Drawing Sheets

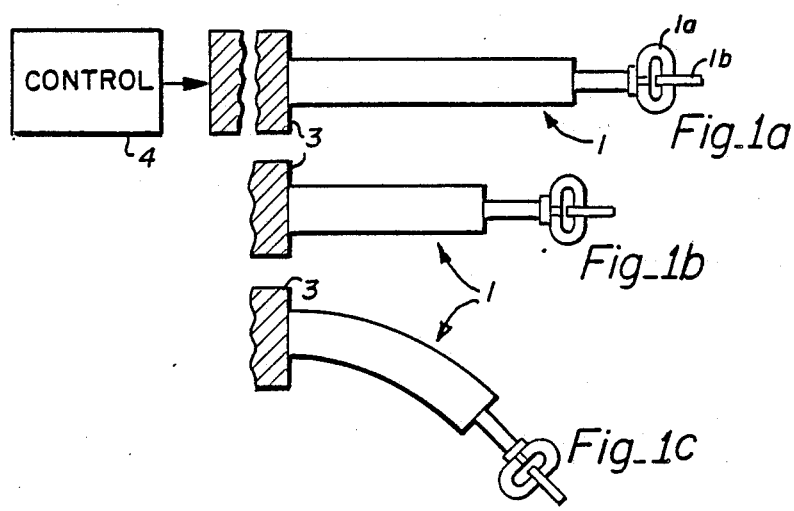
Fig_1a
Fig_1b
Fig_1c
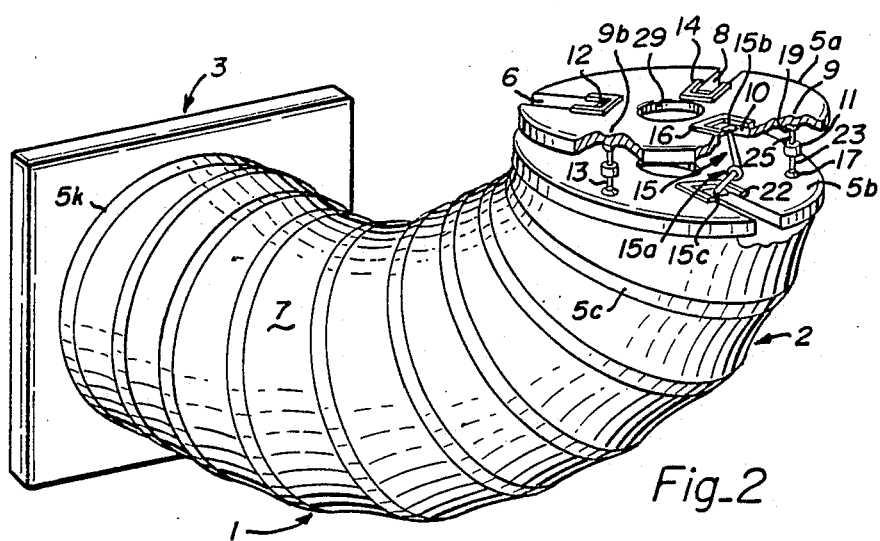
Fig_2
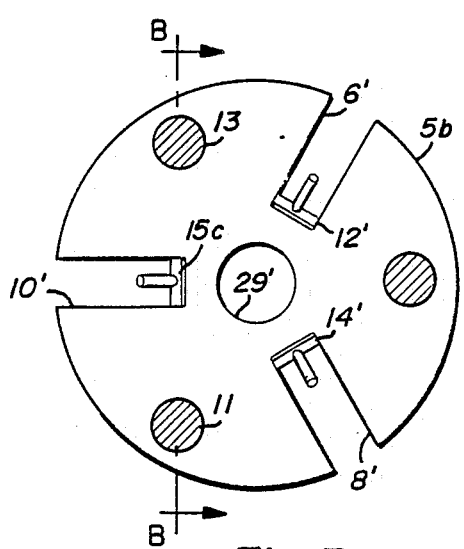
Fig_3a
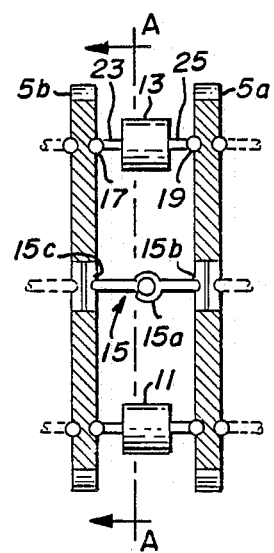
Fig_3b
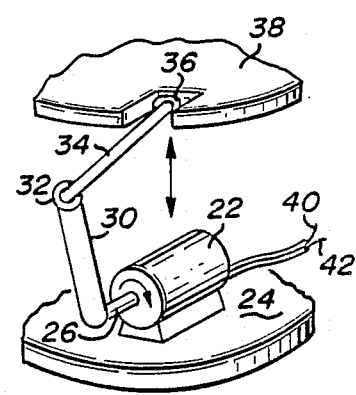
Fig_4

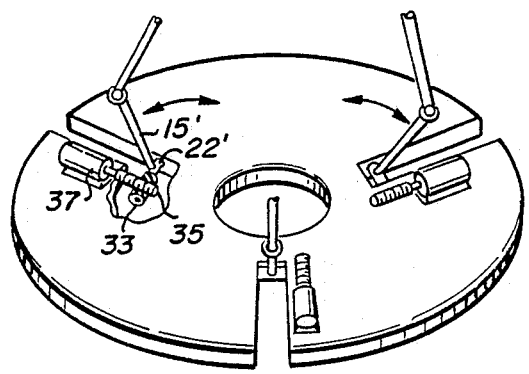
Fig_5
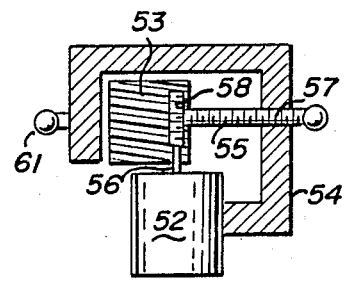
Fig_6a
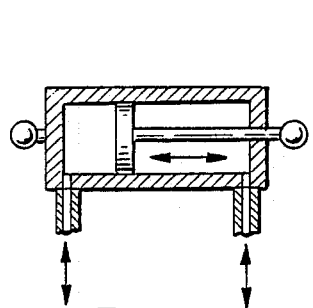
Fig_6b
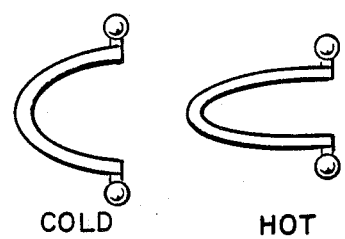
COLD   HOT
Fig_6c
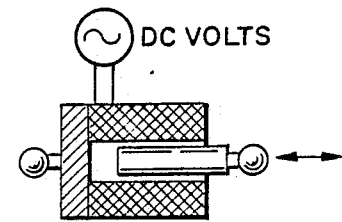
Fig_6d
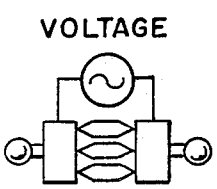
Fig_6
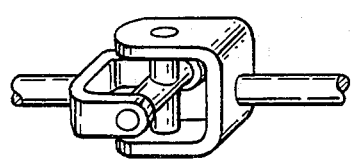
Fig_7
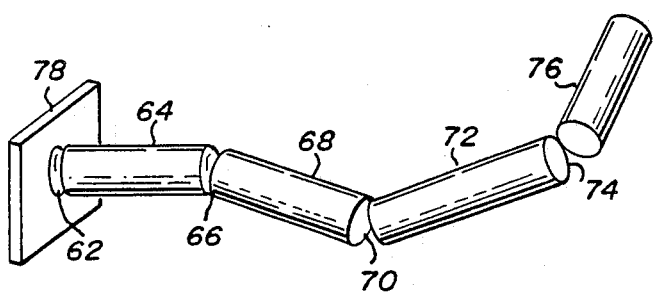
Fig_8
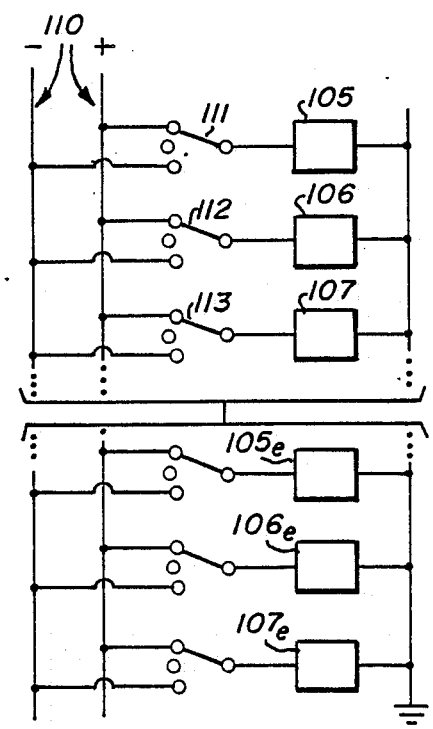
Fig_9

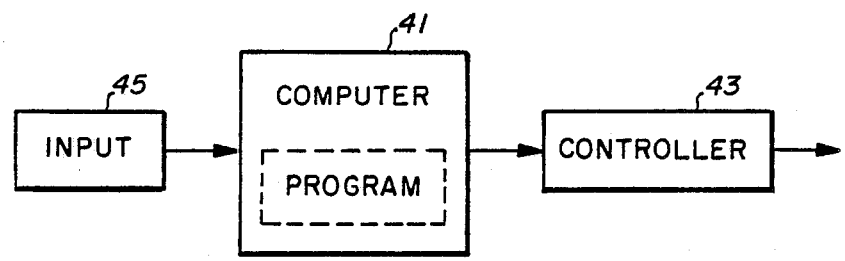
Fig_10
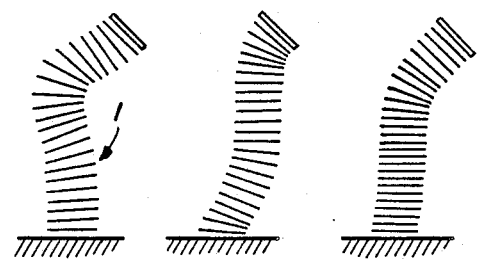
Fig_11a  Fig_11b  Fig_11c
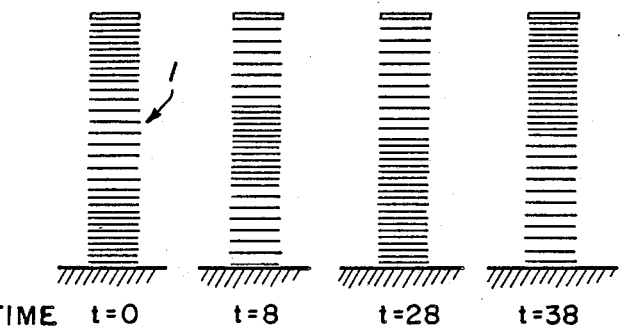
TIME  t=0      t=8      t=28     t=38
      12a      12b      12c      12d
Fig_12
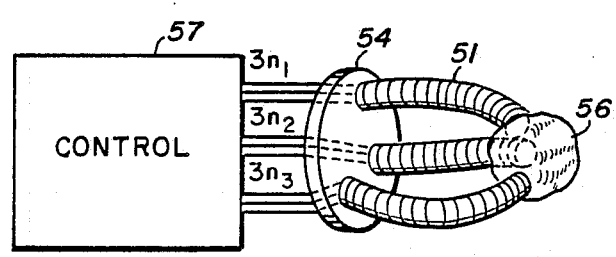
Fig_13

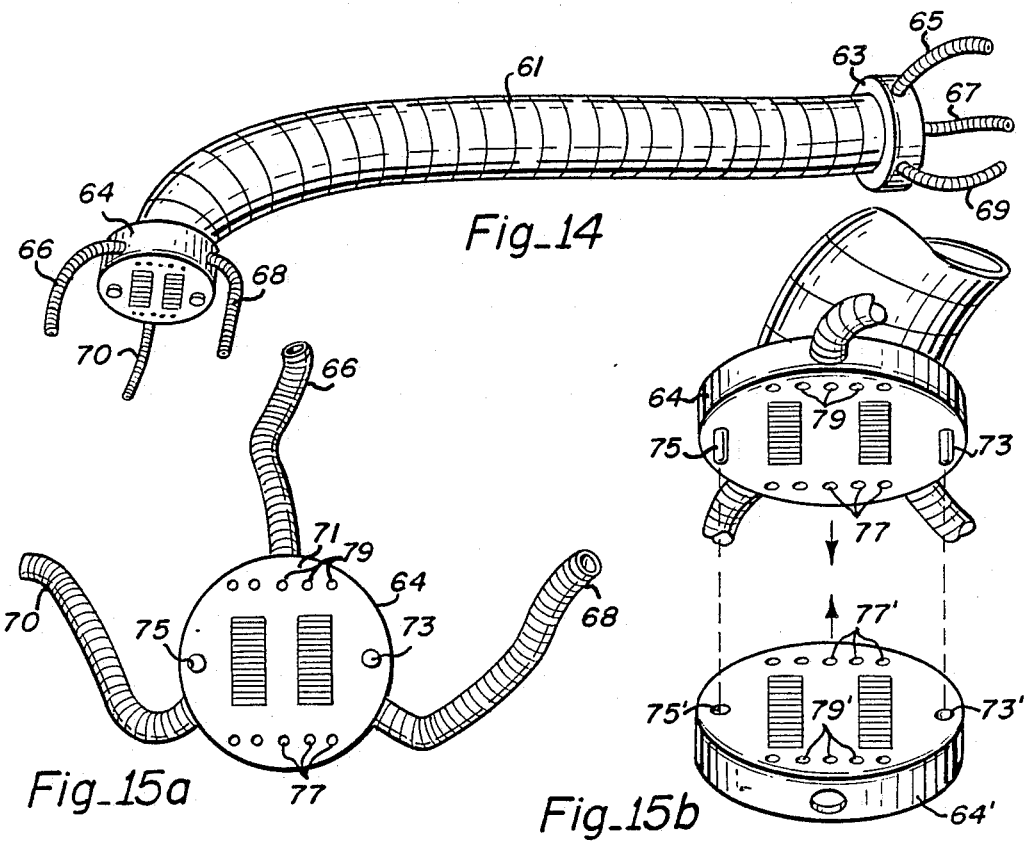
Fig_14
Fig_15a  Fig_15b
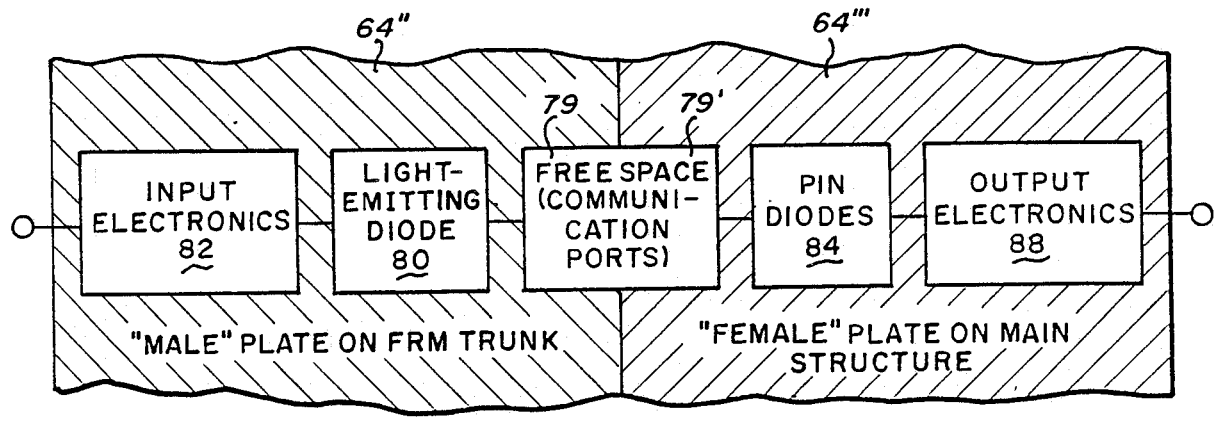
Fig_15c
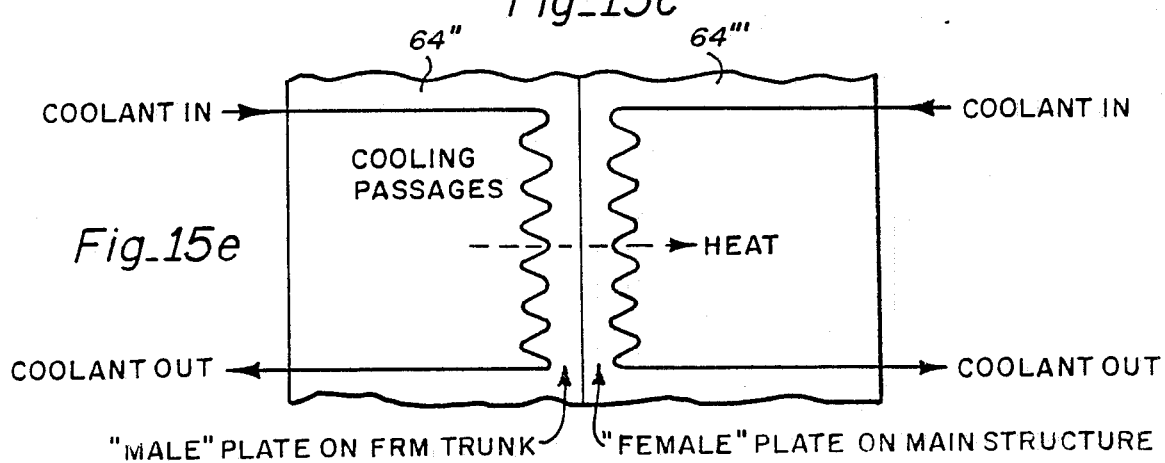
Fig_15e

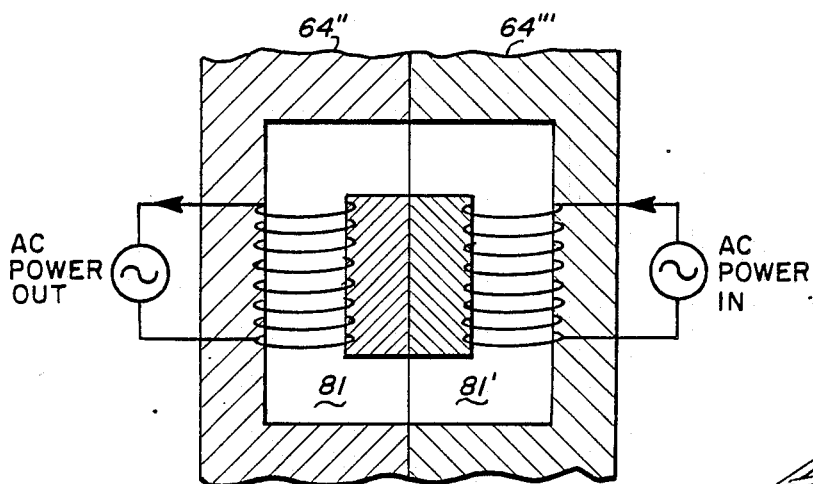
Fig_15d
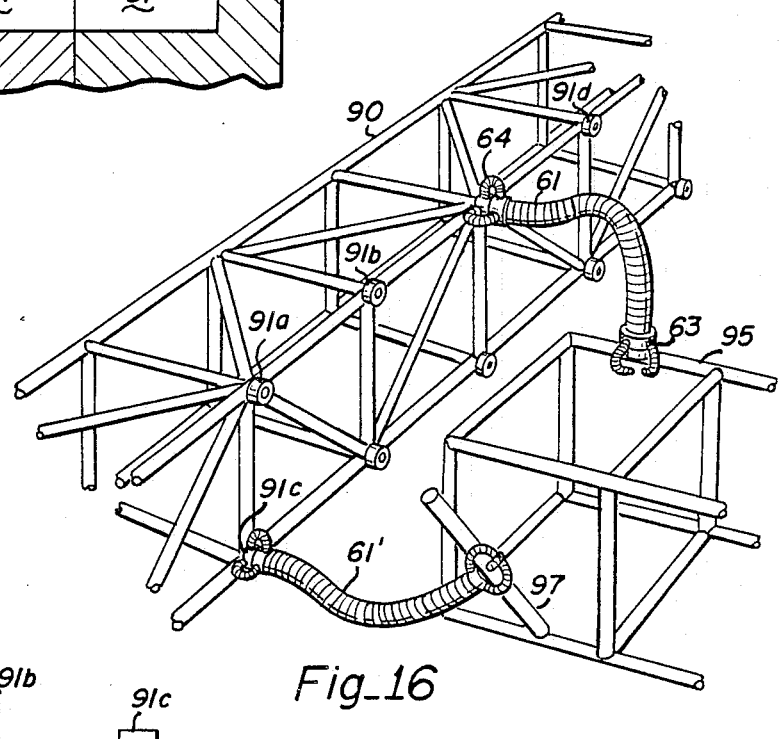
Fig_16
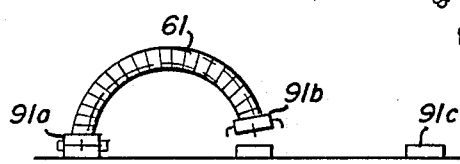
Fig_17a
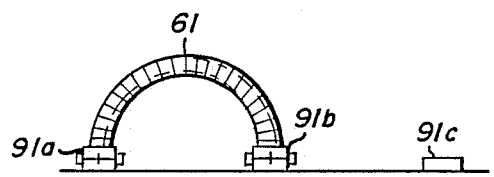
Fig_17b
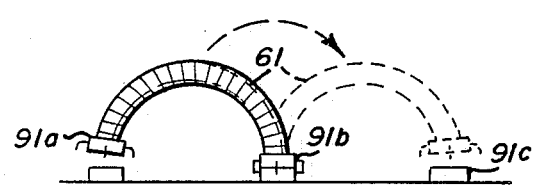
Fig_17c
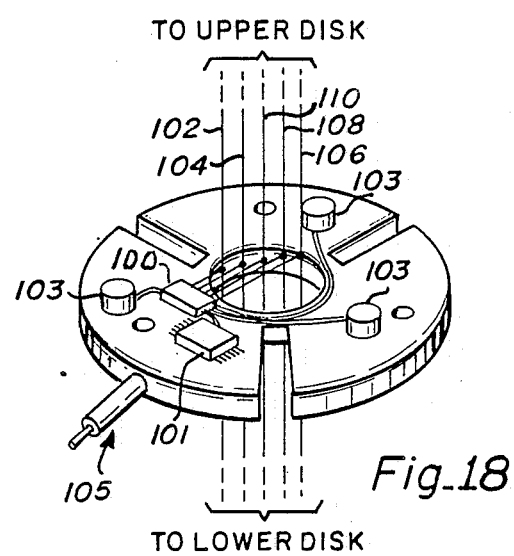
Fig_18

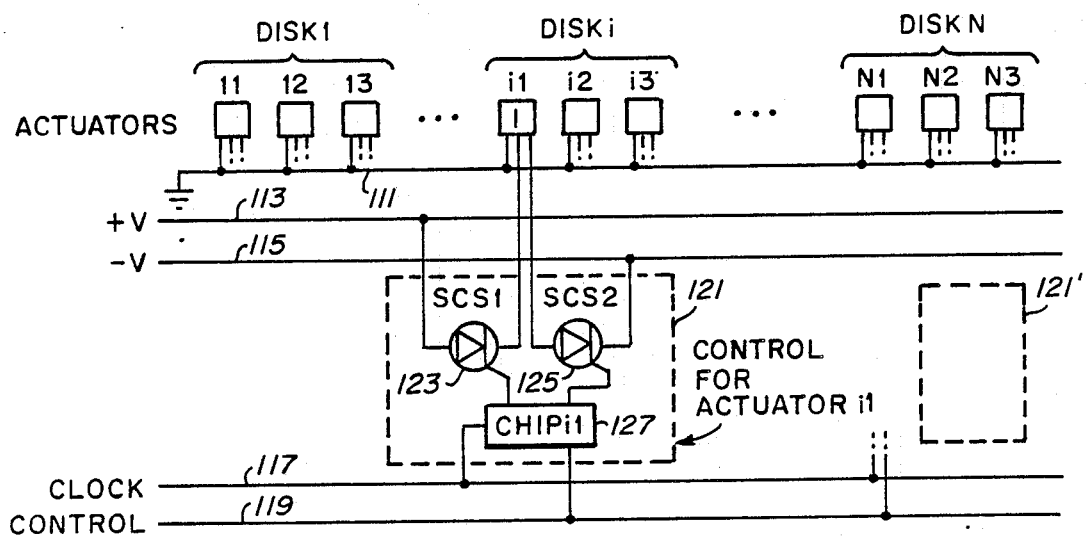
Fig_19a
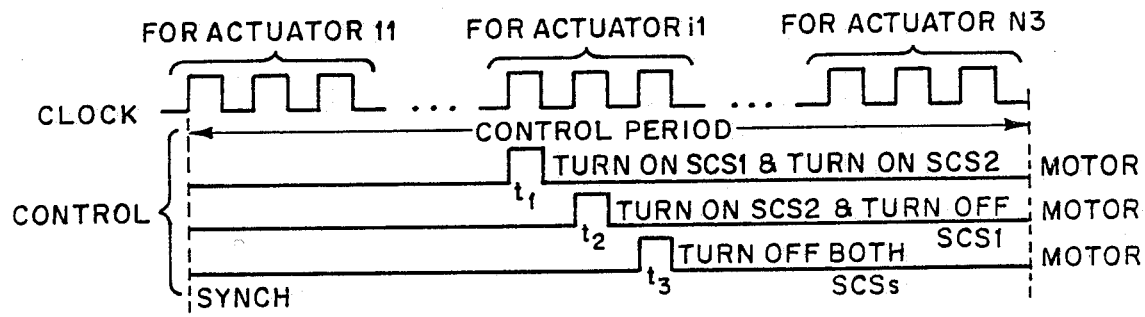
Fig_19b

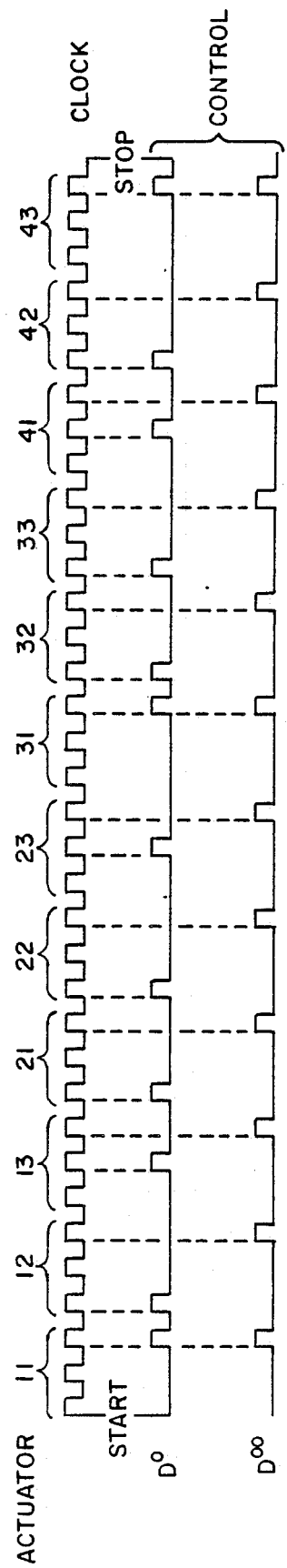
Fig_19d

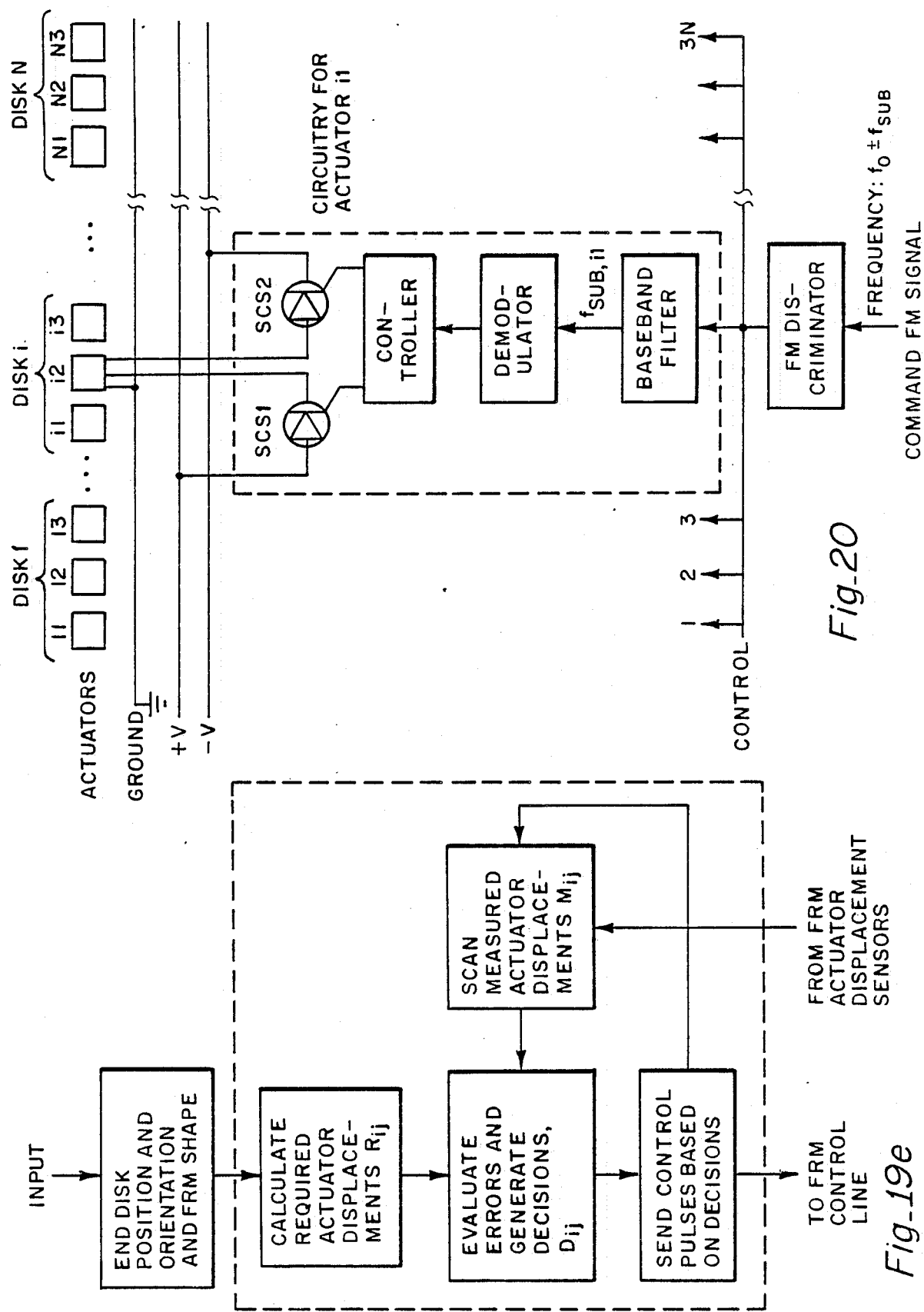

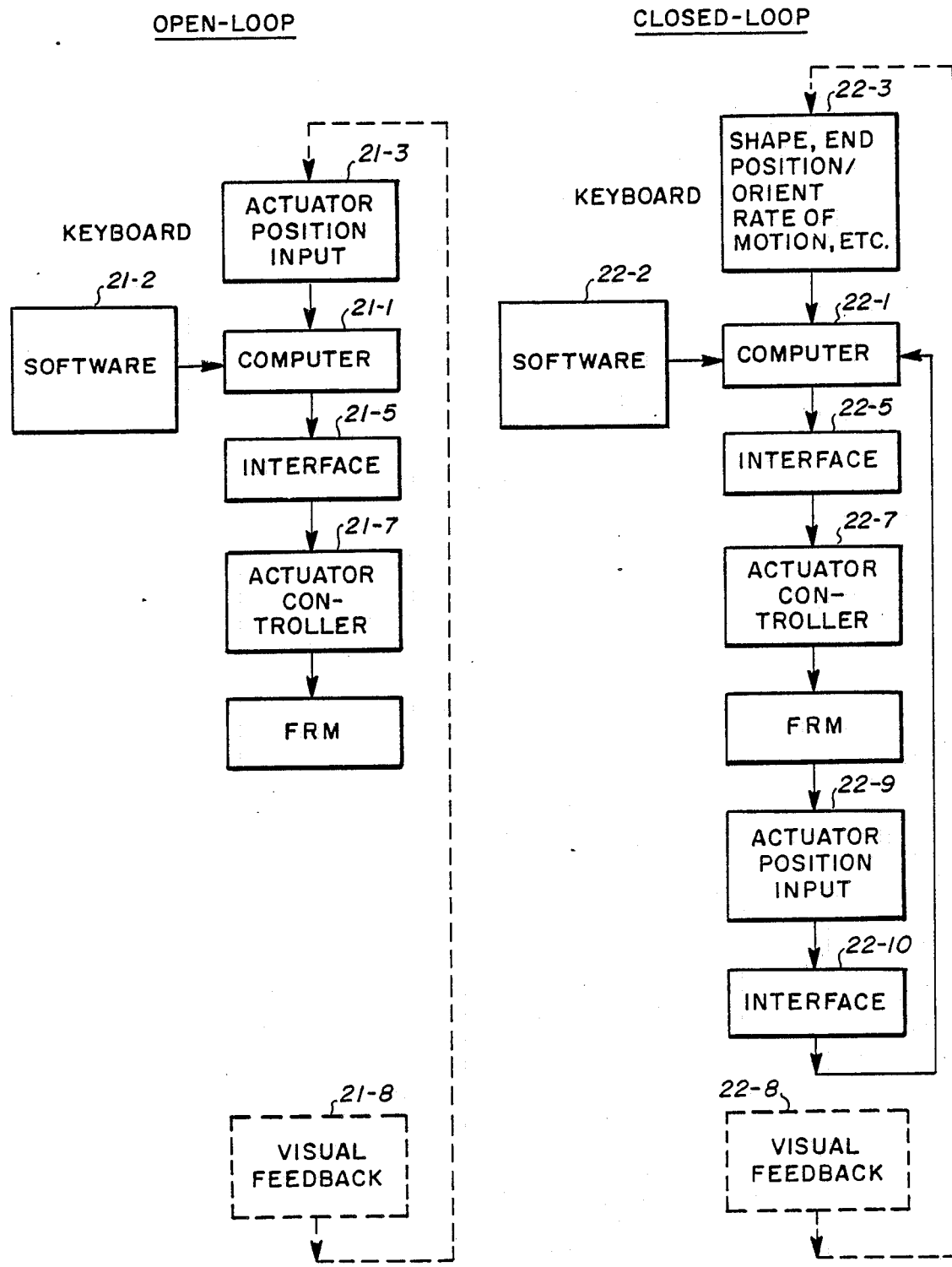
Fig_21  Fig_22

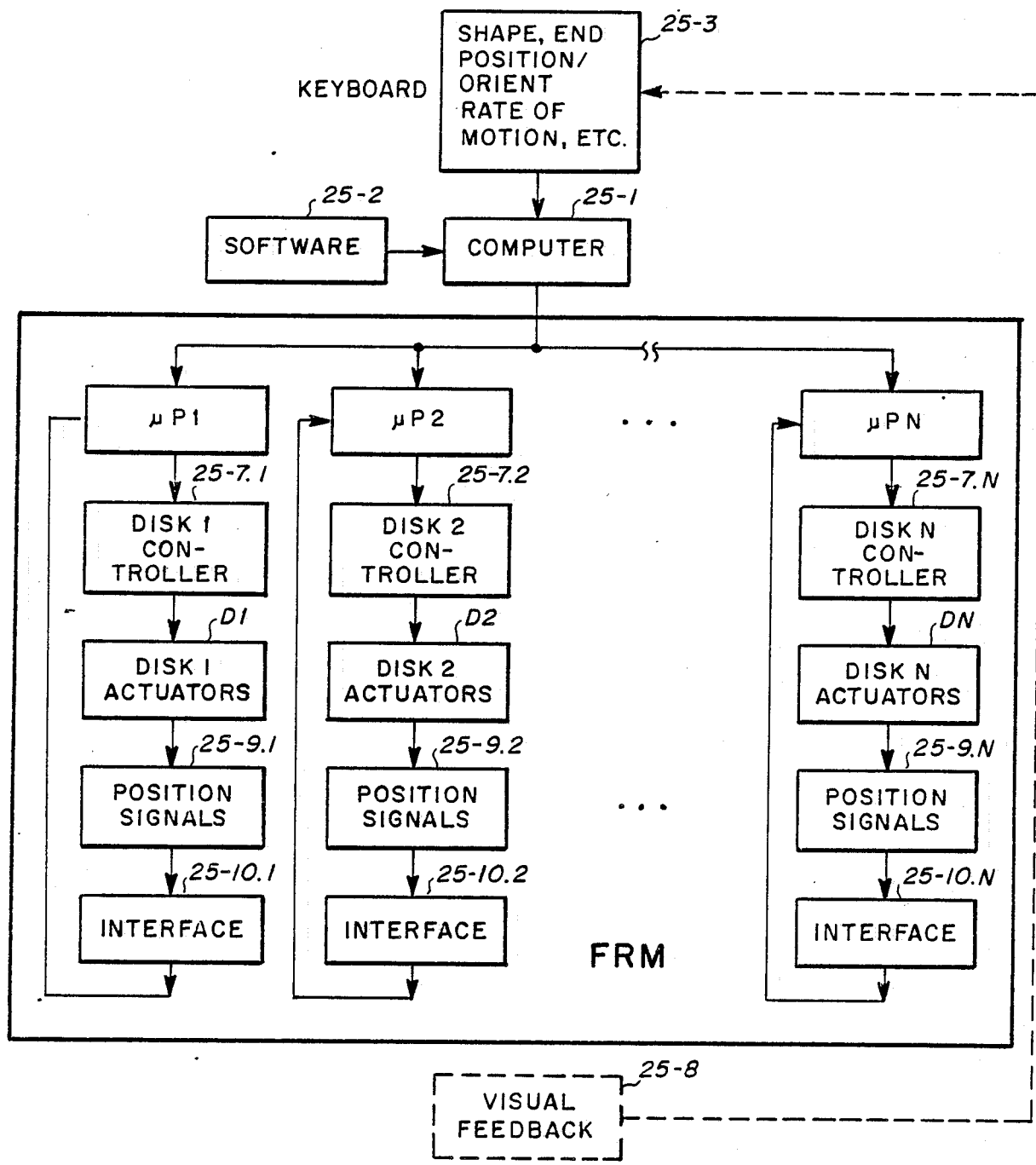
Fig_25

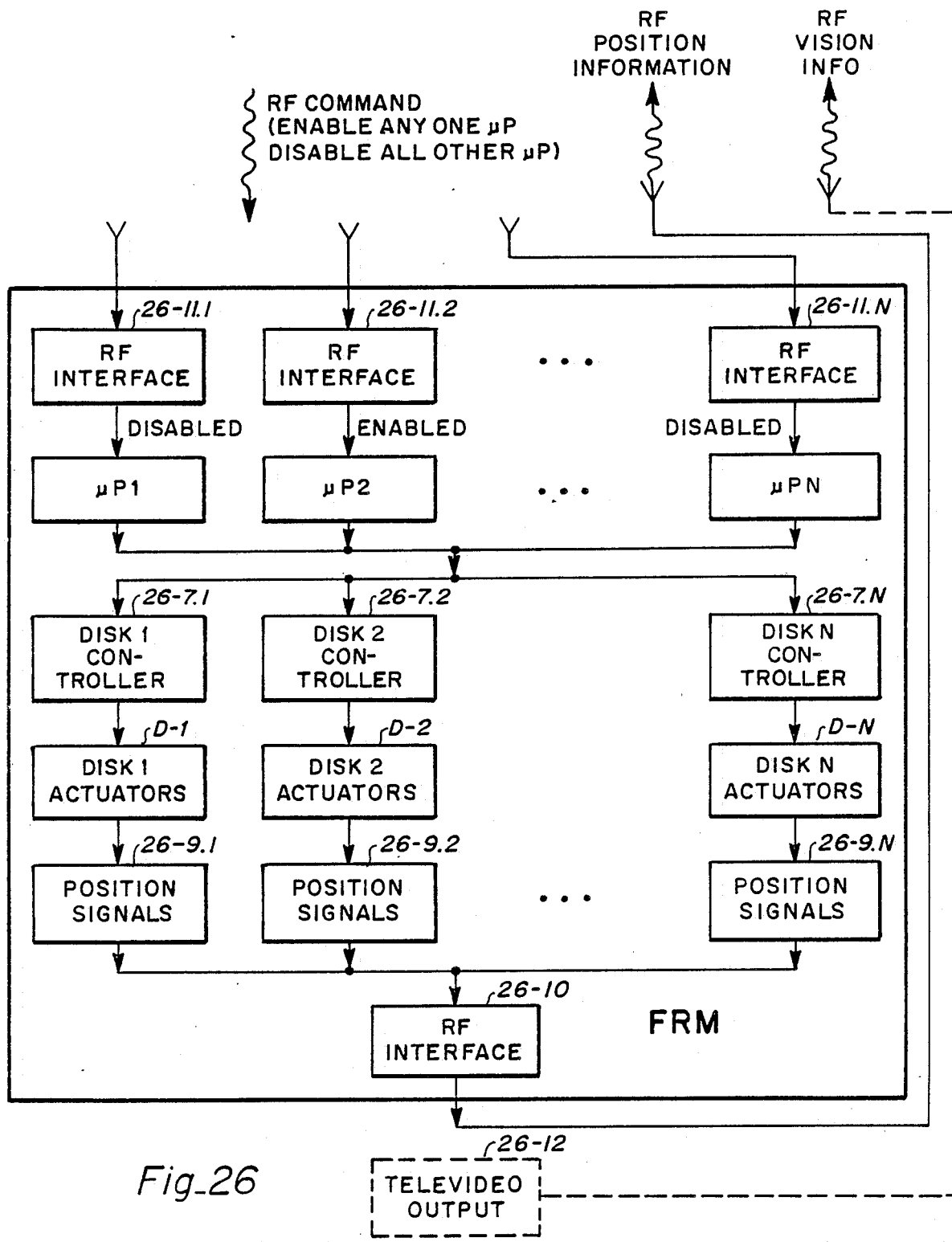
Fig_26

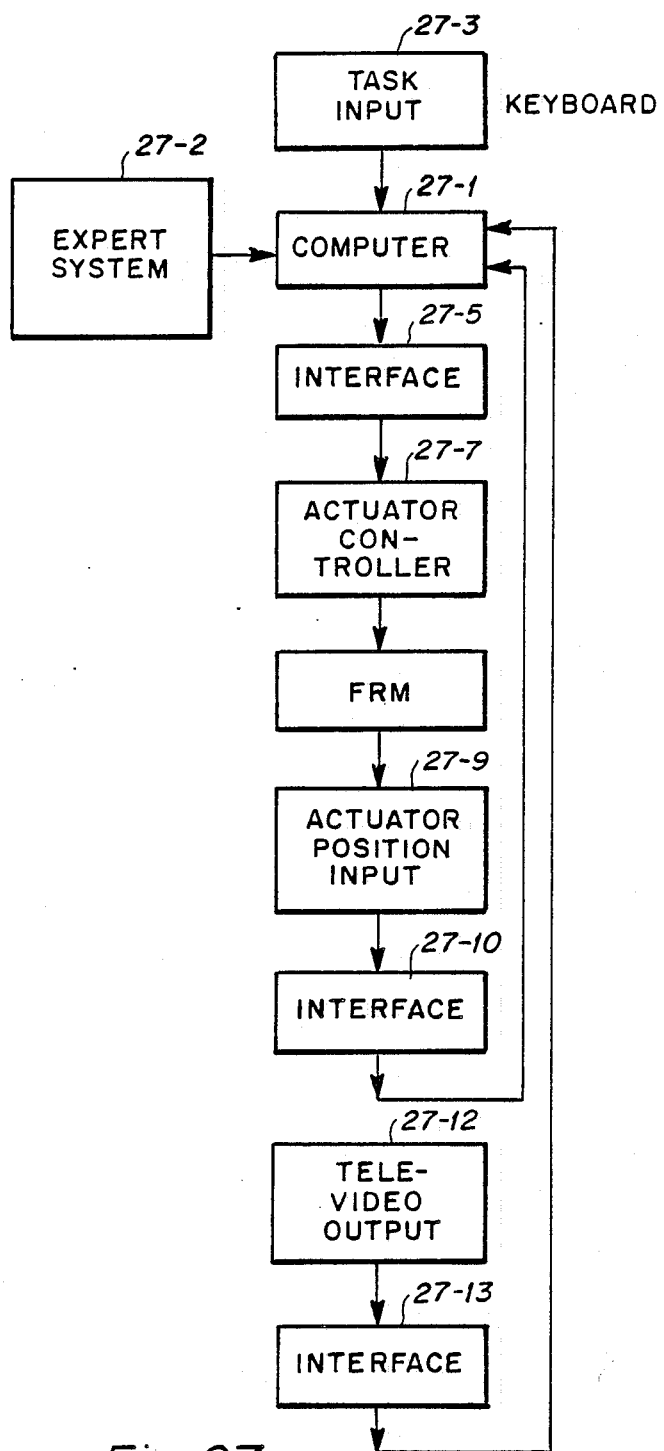
Fig_27

ROBOTIC ARM SYSTEMS

FIELD OF THE INVENTION

This invention relates to controlled mechanical manipulators or positioning devices, and, more particularly, to new autonomous portable flexible, articulated robotic arms and assembly systems incorporating such arms and to systems for supplying electrical power and control signals to robotic arms.

REFERENCE TO RELATED APPLICATIONS

The present application is related to and contains subject Manipulator, Ser. No. 156,256 filed Feb. 16, 1988 now U.S. Pat. No. 4,848,179 of which the present application is a continuation in part. Applicant claims the benefit of 35 U.S.C. 120 with respect to the subject matter of this application.

BACKGROUND OF THE INVENTION

Robotics has come to denote the implementation of human like activities by machines. This includes robots which have the capability of handling materials analogous to handling by the human appendages, including arms and hands. The robot can be controlled to act according to the operator's direction or by the use of a pre-established program to carry out many mechanical functions that substitute for a human, particularly in environments which are hostile to humans. Outer space is one such hostile environment; extremely cold and in vacuum in which a human could not survive without suitable protection.

On Earth hostile environments also exist where a person would be subjected to the ill effects of extreme heat or cold, nuclear radiation, toxic chemical waste, etc. Deep-sea underwater exploration also involves working in an extremely hostile environment, where robotic devices could perform many of the tasks performed by humans in a bathysphere. Even more importantly, the robot can carry out manipulative tasks repeatedly and accurately without tiring. A robotic manipulator forms part of the Robot and performs the manipulative functions.

In the copending application of S. K. Ubhayakar, Ser. No. 156,256, filed Feb. 16, 1988, for an invention entitled Flexidigit Robotic Manipulator, a novel positioning such as a robotic arm or finger member, contains a plurality of substantially identical relatively rigid disks or platforms that define multiple joints in the arm structure. The platforms are spaced and angularly oriented relative to one another by mechanical coupling and positioning means carried by and within the boundary of the platforms, such means being selectively individually operated or controlled. The coupling means serve also as a stabilizer to prevent sideways movement of any one platform with respect to an adjacent platform, thereby insuring rigidity of the device at any assumed shape, while allowing the flexibility of changing the shape. In an additional aspect, the positioning device is ensleeved by a sheath of flexible material that serves as a skin protecting the internal components from external contaminants, such as dust, radiation, corrosive chemicals, and the like. A more specific aspect of the invention is a feature in which the positioning and coupling means includes actuator devices, such as solenoids, motors, fluidic pneumatic cylinders, shape memory alloys, piezoelectric materials or even strings, at each of three corresponding locations on adjacent platforms; and further contains a series of three stabilizer rods, containing ball and socket joints intermediate their length, with the rods hingedly connected at their ends to adjacent platforms for precluding relative sideways movement of those respective platforms, thereby allowing the arm to be structurally rigid at any pre-set shape.

The unique and simple nature of the structure disclosed in the Ubhayakar application allows greater freedom to the designer. Portability has rarely appeared in connection with industrial robots whose function is to stand and perform repetitive tasks on an assembly line. As publicized recently small robots had the ability to wheel around to different locations in a convention hall or the like and raise an arm to serve one a drink as a possible elemental example, but one which is not capable of performing intricate construction work.

In the prior Ubhayakar structure each disk or platform of the robotic arm contained a central opening through which power cables originating in the base extended. Each section of the arm contained its own actuators. Power was furnished to each actuator by a set of electrical wires which extended from the base through the central opening to the actuators. Since these wires were separate circuits as the number of sections to the arm grew the number, weight and bulk of the wiring that needed to be squeezed through the central openings particularly the openings nearest the base grew. The present invention provides the power without the need for the limiting bulk of wires and substantially reduces the number of wires needed to control the arm, even in arms consisting of large numbers of sections.

An object of the present invention is to provide a robotic arm that is portable and easily detaches and attaches to different positions of a support structure. A further object is to provide an assembly or construction system that incorporates positionable robotic arms in which the arms obtain operating energy as well as support though means of the structure that is assembled by the robotic arms. A still further object is to provide a "smart" arm; that is, one which is totally self-contained and one which may be controlled remotely by means of radio communications or other wireless techniques, and/or which can perform at least one manipulative function on its own so to speak. A still further object is to provide a completely self-contained robot arm having "hands" at opposed ends of the arm that contains several "fingers". An advantage of that structure is that one can attach to a surface and allow positioning of other external objects gripped by the remaining hand, a feat that is specifically useful in assembling unique structures. A still additional object is to provide a new assembly technique that incorporates the use of detachable, multi-jointed, robotic positioning members, such as robotic arms and fingers. Multiple controlled arms may be positioned on various portions of structure, assemble additional structure, and then move on to a new location in an almost super human fashion to provide a decided advantage in assembling structures in environments that are hostile to humans.

An additional object of the invention is to provide a power distribution system for a robotic arm that eliminates costly, bulky and heavy electrical wires of the kind presented in the robotic arm structure described in the cited Ubhayakar patent application.

SUMMARY

A multisection flexible multidigit arm contains hands at each end, each of which contains a set of fingers, suitably three, which are similarly formed flexible multidigit arms constructed to a smaller scale. Each hand contains connectors for coupling the hand to a mating connector mounted on an associated structure to provide appropriate power and control signals to the arm. One hand may grip the connector and the other hand is free to move to various positions and perform various tasks. In an additional aspect the arm may move to different locations by somersaulting between spaced connectors in the system. In an assembly system the robotic arms are used to construct frames or other assemblies.

A completely self contained arm includes a self contained source of power. Radio communication means are provided to allow electronic interaction with the arm from a remote location. In an additional aspect the self contained circuitry includes processor means programed to control the arm to perform a certain task, relieving the operator at the remote location from specifying the details. A further additional aspect is the redundancy of control circuitry; this allows one of several alternate circuitry to assume command when one or more of the circuits fail.

Control signals to the sections of the arm in an additional aspect to the disclosed invention are provided by an electrical system that uses only a few wires by multiplexing the signals and the actuators, effectively "time sharing" the electrical leads between the large number of actuators.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the drawings:

FIGS. 1a through 1c symbolically illustrate robotic arm system and a few configurations in which the arm may be positioned;

FIG. 2 is a partial perspective illustration of the robotic arm described in the related application cited earlier herein;

FIG. 3a is a side section view of two elements used in the structure of FIG. 2 and FIG. 3b is a section view taken from the top of FIG. 3a, each of which is drawn to a larger scale than FIG. 2;

FIG. 4 partially illustrates in perspective an alternative actuator that uses a motor device;

FIG. 5 illustrates an alternative construction in which the arm's actuators are an integral component of the stabilizer rod mechanism;

FIGS. 6a, 6b, 6c, illustrate alternative forms of actuator that are useful in the robotic arm;

FIG. 7 illustrates a universal joint that may be substituted for the ball-and-socket joint in the described combination;

FIG. 8 illustrates a related construction for the arm in which the platforms are formed of elongate cylindrical tubes;

FIG. 9 is an electrical circuit diagram illustrating one type of control circuit used for controlling the arm which the present invention improves;

FIG. 10 illustrates in block diagram form a computerized controller for distributing position commands to the elements of the robotic arm;

FIGS. 11a through 11c illustrate various configurations which the arm of the preferred embodiment may assume in positioning the end disk;

FIGS. 12a through 12d illustrate symbolically systolic motion as may be accomplished in a preferred embodiment;

FIG. 13 illustrates robotic fingers and a hand constructed using the principles of the invention;

FIG. 14 illustrates an embodiment of a self-attaching, ambulatory robotic arm in accordance with the present invention;

FIG. 15a shows an end view of a connector used in the embodiment of FIG. 14;

FIG. 15b pictorially illustrates the connector of FIG. 15a in relation to a mating female coupling for coupling signals to and from the arm of FIG. 14;

FIGS. 15c, 15d and 15e show schematically and in block diagram form the communications, power and heat transfer interface between the couplings of FIG. 15b;

FIG. 16 illustrates a novel assembly system which incorporates the detachable manipulator arm of FIG. 14;

FIGS. 17a through 17c illustrate the manner in which the self-attaching arm of FIG. 14 moves from one location to another;

FIG. 18 is a symbolic partial illustration of one platform in a self-contained arm;

FIGS. 19a and 19b illustrate an alternative electrical network for distributing power and control signals to the plurality of electrical actuators in any of the preceding embodiments;

FIGS. 19c, 19d and 19e present a flow chart that describes the control logic of the multiplexing circuit, a timing diagram of the multiplexer output pulses in a specific example, and the logical organization of the processor, respectively;

FIG. 20 illustrates another alternative electrical circuitry for distributing power and control signals to the plurality of electrical actuators in any of the preceding embodiments;

FIGS. 21 through 25 illustrate in block diagram form an open loop type control configuration for the arm, a closed loop type control configuration, a closed loop type configuration containing a "joystick" type control, a closed loop type control configuration with an RF link for permitting remote control, and a control configuration that uses distributed processors, respectively;

FIG. 26 illustrates in block diagram form a remote controlled arm configuration with self repairing capability for the control circuits; and FIG. 27 presents an alternative configuration in block diagram form that includes artificial intelligence based autonomy.

DESCRIPTION OF THE PREFERRED EMBODIMENTS

Figure 19C:
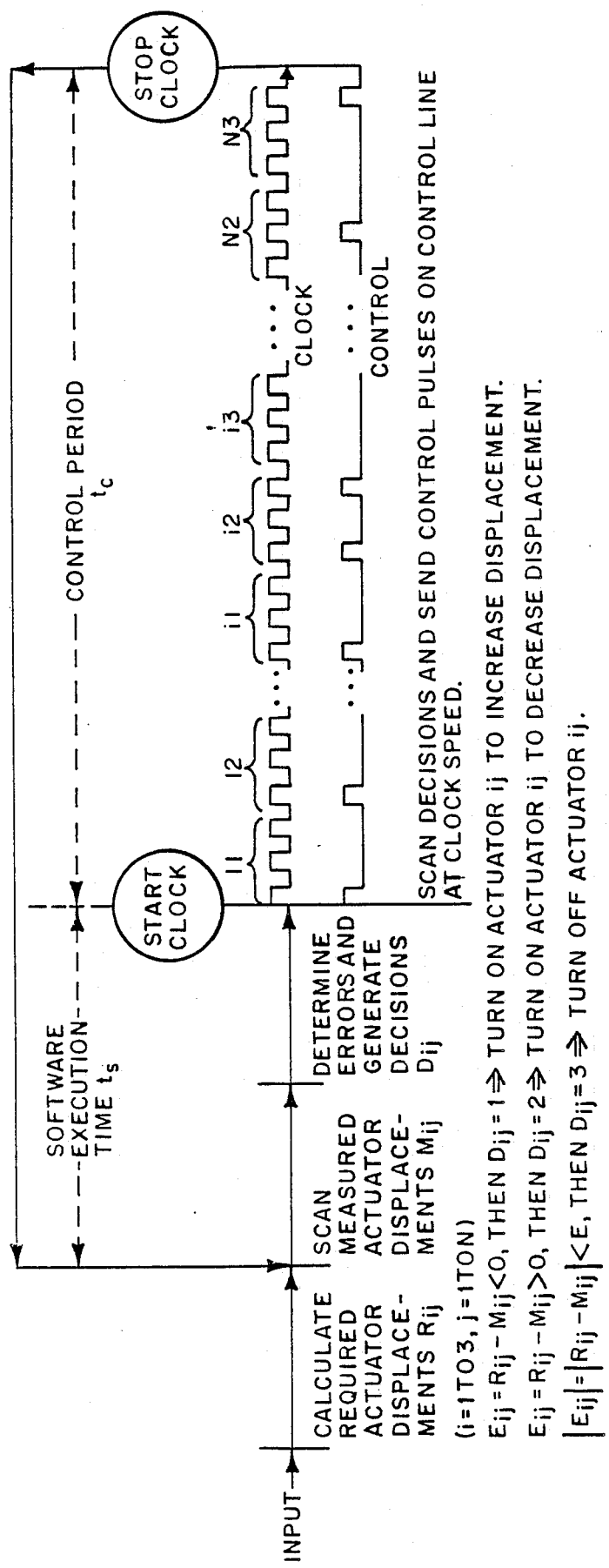

One robotic arm system containing the invention is illustrated pictorially and in block diagram form in FIGS. 1a through 1c. As depicted in FIGS. 1a through 1c, a robotic arm 1 is positionable to an infinite variety of shapes and end positions, a few of which are illustrated. The arm contains a suitable attaching grip, 1a, of any conventional structure attached to an end. The grip is illustrated as gripping and carrying an object, such as a piece of material, 1b. The arm may be fully extended outright, as represented in FIG. 1a; may be contracted to a shorter length or distance as represented in FIG. 1b; and is positionable to form a smooth curve positioning the end disk at a 45 degree angle to the vertically oriented base 3 as represented in FIG. 1c, all of which is accomplished by appropriate selective energization of the individual actuators carried by the platform later herein after described in greater detail under control of a control circuit 4 represented in block diagram form.

Reference is made to FIG. 2 in which the positioning device or robotic arm 1 is partially illustrated pictorially in perspective. The arm is attached at one end to a base plate 3 from which the arm smoothly upwardly curves and positions an end disk or platform 5a horizontally. The arm illustrated includes approximately ten separate disks or platforms 5a through 5k, as variously termed, only the top two of which 5a and 5b are visible in this figure. The disks of the arm are covered by an ensheathing skin or sleeve 7 of flexible material, such as plastic, the right end of which material is cut away in the figure to uncover in part the two uppermost platforms 5a and 5b. As is apparent any number of platforms may be incorporated within the arm, the number being limited only by the strength of materials to support the weight of a large number in an environment with gravity, but which is virtually unlimited in number in a zero gravity environment, such as in outer space.

In this embodiment disk 5a is substantially identical in size and shape to disk 5b as are all of the other disks covered by the sheath. For purposes of illustration, a portion of disk 5a is cut away at 9 and 9b in order to provide a view of actuators, 11 and 13, which in one specific embodiment are electromechanical actuators, and stabilizer member 15, which is one of the three stabilizer members coupled between and located within the area defined by the two disks. The actuators can be any one of the several types described later in this specification.

As illustrated, actuator 11 includes extending links or shafts 23 and 25 and ball and socket joints 17 and 19 in series with the shafts. The shafts are anchored or coupled through the ball joints to the platforms 5b and 5a, respectively. Movement of shafts 23 and 25 into and out of the actuator changes the spacing between disks 5a and 5b at that location, as becomes more apparent from the description of operation that follows in this specification. Actuator 13 likewise includes the shaft and ball and socket joints connected between the adjacent disks at a location spaced from the position at which actuator 11 is anchored. The third actuator, not visible in this figure, is located at a third position spaced from the other two locations.

As illustrated, the stabilizer members and the actuators are located within the area bounded by the peripheral edge of the underlying and overlying platforms. In this embodiment, the locations on the disks to which the actuators are physically coupled form an equilateral triangle; that is, the actuators are spaced apart equally on the disk for symmetry and interchangeability and serve to define three positions of mutual coupling or support between the adjacent platforms. However, the actuators can be located at any three locations, so long as they are not in a straight line. This flexibility of locating the actuators anywhere can be extended to the limit wherein the stabilizer bar member is made to rotate about its hinged axis by a motor, as described in connection with FIG. 5, discussed hereinafter.

Three radially extending slots 6, 8 and 10 are spaced equidistant within the disk in between the three actuators. Hinge joint seats 12, 14 and 16, respectively, are located within slots 6, 8 and 10. The hinge joints in these seats allow for pivotal or hinged movement.

Platform 5b underlies platform 5a and is of a like construction. Platform 5b includes corresponding hinge joint members only one of which 22 is visible in this figure. Here again, the three hinges on each disk lie on the centers of the equilateral triangle sides. However, as those skilled in the art recognize, the arm will work as well even if this triangle is other than an equilateral triangle.

It is noted that the hinge joint member in the underlying disk includes a like member stemming from the under surface to a position to the next most adjacent disk or platform 5c. That member, however, is not illustrated in this figure, but is better illustrated in FIGS. 3a and 3b.

The stabilizer bar 15 includes an intermediate ball and socket joint 15a from which stems a shaft which is connected to the hinge 15b of the upper platform and a second shaft which is connected to hinge joint 15c of the underlying platform. A like coupling and stabilizing bar arrangement is included at those locations of the disk represented by the hinge seat 12 and 14, the details of which are not visible in FIG. 2. As becomes apparent to those skilled in the art, without the hinged stabilizer bars or an equivalent, the use of only ball and socket joints ordinarily permits a sliding movement between the two adjacent platforms, due to the hemispheric freedom of movement inherent in the ball and socket joints. As the platforms move sideways relative to one another, the ball would simply rotate in the socket. The stabilizer bars prevent that undesired sideways movement. The hinge joints permit movement in only one direction. Each hinge joint is arranged for rotational movement about its respective hinge axis and the three hinge axes are oriented in different directions, approximately 120 degrees apart for the equilateral triangle configuration. Thus should a sideways force be exerted at any peripheral location upon one platform relative to the underlying platform, even though any one hinge joint may be free to hingedly pivot, the axes of the two remaining hinge joints are such as to resist and oppose that movement, making such undesired sideways movement impossible.

The illustration of FIG. 3a provides a top view of one of the platforms used in FIG. 2 taken along the lines A—A in FIG. 3b and shows the location of the individual actuators 11 and 13, the radially oriented slot 10', and the central opening 29'. The elements in disk 5b depicted in the view that correspond to the elements of the like adjacent disk 5a are identified by the same numeral, primed. A partial section view of the arm taken along the lines B—B in FIG. 3a is presented in FIG. 3b and better illustrates from a side elevation the two adjacent platforms, two of the actuators and the relationship and mounting of associated stabilizer members and actuators in adjacent platforms. These views are drawn to a larger scale than shown in FIG. 2 in order to provide greater clarity. The platforms may be of metal, such as aluminum, or other material that is strong and rigid. It is noted that the ball and socket joints in FIGS. 2, 3a and 3b can be replaced by equivalent universal joints such as discussed in connection with FIG. 7.

Each portion of the arm portions defined by two platforms or disks is sometimes referred adjacent to as an arm "section" for convenience of reference or description. In that context the platform that defines a top end of one such section also serves in common as the bottom end of the next most adjacent arm section. In moving that top platform relative to the bottom platform of a given section by the means earlier described so as to change the spacing and angular orientation of the one platform relative to the other, collectively referred to as "position", the length and angular orientation or position of the next most arm section, that in which the moved platform serves as the bottom most platform, is changed relative to both the arm section containing the actuator and relative to the base end of the entire multisection arm.

Each actuator illustrated in the preceding embodiment is one of several types possible. One type is depicted in FIG. 4 and is an electrical motor driven device. As shown a motor 22 is mounted upon a platform 24, partially illustrated. The motor contains a driven shaft 26, an arm 30, ball joint 32, extending arm 34 and ball joint 36 connected to a second platform 38, partially illustrated. Electrical leads 40 and 42 are provided for supplying power through a controller, not illustrated. With power supplied to motor 22, the shaft rotates permitting the arm 30 to raise, which in turn lifts platform 38 vertically at that location relative to the underlying platform. Should power to the motor continue, the shaft will eventually allow the arm to move downwardly, so that the two platforms are moved closer together at that location. With a motor driving a worm gear screw reduction mechanism, when power is removed the shaft remains at that location upon de-energization of the motor. In this manner the spacing between the platforms may be adjusted or controlled through application of electrical current of a preset duration and that spacing is fixed.

The ball joints 32 and 36 allow the distance between the two platforms to be changed and simultaneously allowing different orientations of the platforms. It is understood that like motor mechanisms are substituted for the two other actuators on the lower platform so that three such positioners may adjust the relative position of the axes of the two platforms. Moreover, the three stabilizer bars are included in the arrangement though not illustrated in this figure. With the motor type positioners the adjustment between adjacent platforms may be finely adjusted.

An alternative structure combines the actuator and the stabilizer into a single assembly as is shown in FIG. 5 to which reference is made. The stabilizer bar 15' in FIG. 5 is attached to shaft 22' of the hinge. This shaft is coupled to a gear 33 driven by a worm screw 35, which in turn is coupled to a motor drive 37. Hence when the motor turns, the stabilizer bar rotates about its axis. The same electromechanical arrangement is repeated at the other two hinges. Therefore, by controlling and fixing the angular positions of the three stabilizing bars on any platform, the relative distance and orientation of the adjacent platform connecting the three stabilizer bars by means of the three ball and socket joints can be controlled and fixed. In this simplified embodiment, the only supports between any two platforms are the three stabilizer bars.

However, the structure of FIG. 2 which contains both actuators and stabilizer bars possesses advantage over the alternative structure illustrated in the embodiment of FIG. 5. In the former structure all of the loading or force is axially directed; the force on the actuators is axial and the sliding force if any is translated to an axial force on the hinge joints associated with the stabilizer bars. In the embodiment of FIG. 5 in which the hinges are driven, the forces are translated to a torque on the hinge and associated driving gears, such as gear 33 in FIG. 5. Since structural materials withstand axial loads better than torque loads, the embodiment of FIG. 2, and, of course, FIG. 4, has greater strength than the arm constructed in accordance with FIG. 5.

A motor driven actuator containing a gearing mechanism of the type earlier referred to is partially pictorially illustrated in FIG. 6a. A reversible DC motor 52 is mounted in a frame 54. A rotatable shaft 56 driven by the motor contains a worm gear 58 that engages the teeth of a wide gear 53 that in turn is coaxially connected with a screw shaft 55 that is mounted in a threaded passage 57 in frame 54. The other end 61 of the shaft drives the rod in FIG. 4. The actuators in the present embodiment can be any one or combinations of many known forms such as symbolically illustrated in FIGS. 6a through 6e including: (1) Other electrically driven actuators, such as the solenoids of FIG. 6d, motors with gears represented in FIG. 6a, piezoelectric crystals represented in FIG. 6e; (2) Heat driven actuators, such as shape memory alloys (example, "Nitinol") represented in FIG. 6c; (3) Fluid pressure (gas or liquid) driven actuators, such as piston-cylinder devices represented in FIG. 6b. As is apparent the actuators may be of many kinds as fit within and perform the functions described. These devices are known to those skilled in the art and need not be described in detail. Reference has been made to the use of ball and socket type joints, which is preferred, although a less preferred equivalent may be substituted for that joint, such as the universal type joint illustrated pictorially in FIG. 7. The universal joint though more complex is still relatively simple in structure and is inexpensive.

An alternative construction provides a manipulator arm which is segmented and cannot form the more smoothly defined curves described in connection with the first embodiment. This alternative is presented in FIG. 8 which as shown contains the appropriate pairs of disks which form a moveable joint. Further the embodiments contain straight relatively rigid lengths of a tubular member intermediate those disk pairs. This includes the disk pairs identified as 62, 66, 70 and 74 pictorially represented in the figure and tubular sections 64, 68, 72, and 76, supported from a base 78. A particular structure of the disks incorporated in the joints of this embodiment is essentially the same as that described in the preceding embodiments, except that the underside of one of the disks is not movable and hence that disk need not contain the cut out sections and visible joints. That counterpart section is at the other end of the tube. If the length of the tube were contracted to a small amount so that the left and right ends were effectively consolidated into a single disk, the structure of the preceding embodiments results.

FIG. 9 schematically illustrates an electrical circuit for selective control of electrically driven actuators. For example, the actuators associated with the lower most disk 105, 106 and 107 can be operated by switches 111, 112 and 113. Likewise the actuators 105e, 106e and 107e associated with the end disk are illustrated connected via cabling through to the control circuits. For convenience the remaining actuators and associated control circuits are omitted and are represented by the dash lines. The control circuit in its simplest form includes a source of power 110 and a series of switches 111, 112 and 113 which open and close a circuit to the associated actuator to furnish electrical current in a path extending from the power source through the switch and actuator and back through the cabling to a common electrical ground. By judicious operation of the switches associated with all of the actuators acquired through practice, the arm may be made to bend or curve in the manner previously described.

It is apparent that at a minimum at least four wires are required for each joint within the robotic arm. Hence the cable in this kind of control circuit must include a number of wires of four multiplied by the number of joints. An arm with ten joints would thus require a cable containing at least forty insulated conductors and the center clearance hole in the bottommost disk must be sufficiently large to allow passage of the requisite number of wires. Other arrangements for the control circuitry which serve to reduce the number of wires required in the control cables can include arrangements using multiplexing techniques, which is described later in this specification.

Brief reference is again made to the illustration of FIG. 3b. A position sensor 18, which is included in an alternative embodiment of the invention, is represented in dash lines. Three such sensors are provided, one of which is associated with a corresponding one of the three actuators. The position sensors may be of any known construction, the details of which are not important to a description of the invention. In such an embodiment, the position sensor provides electrical signals or characteristics that represents the disk to disk spacing at the location of the actuator with which the sensor is associated or paired. Each position sensor is coupled by electrical conductors, not illustrated, in a known manner to the control circuits at the operators station at which the electrical leads are connected to suitable known monitoring and/or display apparatus to permit visual read out and/or are connected to the control circuits for the arm to permit automatic interrogation of the respective sensor's position information. The latter arrangement allows the control circuits to act in response to the sensor's position information. Illustrations of embodiments which use the sensors are described later in this specification. As those skilled in the art appreciate, alternative position sensor arrangements may be used in as much as the invention is not limited to any specific kind or type of position sensor. For example, position sensors that measure angle may be included to measure the angle of the hinge in the embodiment which uses a hinge so that the spacing is determined by a trigonometric calculation depending on the length of the rod associated with the hinge at that joint.

The elementary control and power circuit described in FIG. 9 in connection with the actuators may be replaced by circuits of greater complexity and sophistication, such as a processor or computer. As represented in block diagram form in figure a computer or processor 41 as variously termed, contains a program and is connected with an interface or controller circuit 43. An input device 45, such as a keyboard or joystick or any combination, allows the operator who is controlling the arm to supply the input to the computer. In turn the computer translates the input according to the installed program, whether hardwired in read only memory or as software or as a combination thereof, into the output signals required to energize selected actuators in the arm of the embodiment of FIG. 1. The computer and input devices are of conventional structure and need not be described in detail. In accordance with the principles of the present invention, the computer is programmed in a variety of ways to allow the arm or fingers to be positioned responsive to the input.

The computer is suitably programmed to (a) interrogate the input device for input information keyed in by the operator; (b) interpret the input; (c) determine the steps, namely the selection and operation of the actuators as will accomplish the movement of the arm to the specified location, if the end location is specified, or if movement from an existing location is specified. In this connection, the program includes a subroutine which checks to determine the current location of the arm end (and hand position) as stored in registers in the computer. This establishes a position from the original base line; executes another subroutine that determines and or calculates the final end position based on the interpreted input; either calculates the position for each actuator in the arm to attain that position or alternatively calls upon a memory bank containing the actuator position information associated with a specified position; and executes an output routine that outputs this information to the controller interface, either as complete data; i.e. a parallel output, in a form that is interpreted by the actuator controller or alternatively sequences the information out to the interface serially so that the controller may act on each set of actuator data on a one at a time basis.

A controller is a circuit device which translates the computer's output signals into electrical power for controlling a peripheral accessory device. Examples available of controllers include the controller "cards" which are installed within the "slots" of personal computers, such as those computers sold by the IBM Corporation, allowing the personal computer to control motors, servos and the like electrically controlled equipment. In effect, software commands are converted by the controller to electronic power pulses that drive the accessory device.

The computer and the controller also share a common clock, the electrical oscillator that supplies the timing pulses in the computer system. This allows the two devices to have synchronized timing, which is necessary for the control and multiplexing function elsewhere herein described.

The controller in this embodiment acts directly to energize the actuators, if the actuators are wired separately as presented in the elemental circuit of FIG. 9. Otherwise the controller converts the individual actuator data into the form required by the control signal communication circuit, such as the multiplexing circuit, using the time or frequency multiplexing described later in this specification. With the computer, a wide number of options is thus possible within the framework of the disclosed system.

The details of those programs may be determined hereafter empirically and may be in any level of language. For example, the upward movement on the joystick will cause the arm to move up. A command entered into a keyboard, e.g. "go to point x, y, z", causes the computer to provide the appropriate outputs to the actuators that allows the end of the arm to move to that position.

As is apparent, the arm may be operated to achieve a variety of curves in order to appropriately position its end as desired by the operator who is controlling its movement and, ultimately, the position. As depicted in FIGS. 11a, 11b and 11c, the end disk in each illustration is positioned at the same angle with respect to the horizontal and the same distance from the midpoint of the base member. The path or curve assumed by multisection arm 1 in so positioning the arms end is different in each case. The configurations illustrate the flexibility of the invention; it allows the arm to be routed around those structures or objects to achieve the proper position of the arm's end. This is most useful in situations in which the arm is used to assemble or position members in a complex mechanical environment.

The versatility of application is apparent. The invention has capability for systolic motion. This is represented in FIGS. 12a through 12d, which illustrates the position of the various joints or platforms which compose the robotic arm 1 at different intervals of time. In each figure the end disk is maintained constant in angular orientation and position. The intermediate disks may be moved closer together while others of the disks in the series are moved further apart so that the net result is that the end disk does not move. Hence, systolic motion is provided.

The flexible robotic arm positioning device described may be mounted with additional structures of like construction to a common base, such as illustrated in FIG. 13. In this figure, three such manipulators 50, 51 and 52, which are of identical construction to the embodiment previously described, are fastened to three different locations upon a base or disk 54. As illustrated the positioning members form three "fingers" and the entire arrangement may be referred to as a robotic "hand". As illustrated the fingers are positioned so as to hold a small object, such as a rock 56 between the end. For purposes of this illustration, the control circuit for the actuators is illustrated simply by the block labeled control 57. The control may be of the simplest form such as the switch arrangement of FIG. 9 or be of the more sophisticated form of computer controlled arrangement described in FIG. 10. As an additional embodiment the base 54 may serve as the end disk of a much larger robotic manipulator arm so as to form an "arm" containing a "three fingered hand". The control thus serves to control all of the arm sections, including the "fingers".

The small arms that are referred to as "fingers" are part of that overall arm construction and are subsumed within that description by the reference to arm sections. Thus the control input may relate to the positioning of the three fingers to accomplish a specified configuration or position for those fingers, either concurrently or separately with the configuring of the larger manipulator arm that carries those fingers.

From the foregoing description of the construction of the multisection arm it is evident that power is distributed spatially over the arm's length, which is an advantage. The arm may be built with identical mass produced components, allowing for lower manufacturing costs and easier repair should any element be broken. The structure is easily scaled in a wide range of sizes. Any critical disk pair moreover can be made stronger than other disk pairs by incorporating a stronger more powerful actuator on the disk pair. As desired the disk pairs may be made consecutively smaller in size to provide a tapered profile if desired. And the arms may be easily and accurately controlled by a computer as was earlier described.

A multi section arm that is self-attaching is illustrated in FIG. 14 to which reference is made. As shown arm 61, which is constructed according to the foregoing principles, includes a "hand" heretofore described at each end. At the right end of arm 61, a hand 63 contains three fingers, 65, 67 and 69. On the left end, the second hand 64 includes three fingers, 66, 68 and 70. A portion of the covering sheath is cut away from the arm in the figure to show the general spaced disk like arrangement inherent in the structure which is as previously described in prior embodiments. Each of hands 63 and 64 includes a face portion containing appropriate connecting arrangements that permit the communication of heat, electrical power and control signals into the various actuators situated within and carried by the various disks or platforms forming the arm and the fingers.

Details of the face portion of hand 64 are illustrated in the front view of that member presented in FIG. 15a to which reference is made. The face includes a pair of projecting cylindrical pins 73 and 75. These pins align and mate with coupling holes in an associated base connector, illustrated in FIG. 15b. A series of optical couplers 77 and 79 provide the communications path for transmitting control signals from within the arm and vice versa to the associated control equipment. FIG. 15c illustrates one pair of optical couplers in the form of a block diagram. This includes conventional light emitting diodes 80, which are used to convert the electrical coded pulses to corresponding pulses of light; conventional electronic circuits 82 to drive the light emitting diodes; PIN diodes 84 that are photosensitive and convert the light pulses sent over the interface 79 and 79' into conrresponding electronic pulses; and further conventional electronic circuits 84 for further processing the electronic pulses.

The two portions of a split transformer 81 are flush with the surface of the plate. The split transformer is one which contains a single AC winding on each side of the split half as shown pictorially in FIG. 15d. When the magnetic iron laminations of the one half on the FRM end coupling containing the secondary winding 81 are mated at the interface represented by the vertical line with the appropriate remaining half of the iron laminations containing the primary winding, 81', the magnetic induction coupling between the laminations defines the transformer and serves to couple AC power from the primary to the secondary winding, which is conventional. The appropriate AC power taken from the secondary is applied to the rectifier and direct current circuits used in the arm in a conventional known manner to supply dc power to the various electrical devices included.

In many applications, the heat generated by the FRM components must be removed to prevent overheating. This heat can be transferred across the two halves by conduction at the thermal interface in the FRM's end coupling or "hand", as illustrated in FIG. 15e. Here, an appropriate liquid, the coolant, is chosen to carry the heat from the components within the arm to the "male" plate. This heat is then picked up by the "female" plate by similar liquid cooling. The heat transfer across the interface is by thermal conduction through the body of the plates and through the interface itself.

A self-attaching arm of the type disclosed in the figure may contain an arm portion that is between ten and thirty feet in length, by way of example, while the fingers associated with the hand are somewhat smaller in diameter and in length; extending perhaps between one to three feet. However, these exemplary dimensions can be smaller or larger depending on specific needs.

The self-attaching and detaching robotic arm as illustrated in FIGS. 14 and 15a may form part of a novel construction or assembly system that is illustrated in FIG. 16 to which reference is made. Such an assembly system is ideally suited for use in space where gravity or weight considerations are not important from the viewpoint of self-weight of the arm itself. As illustrated, the system includes a three dimensional truss or grid 90 containing the various hollow cross members and braces arranged to form a rigid rectangular skeletal support frame structure. Various connectors 91a through 91h, which as illustrated, are affixed at various spaced locations within the structure. Appropriate electrical cabling, not illustrated, is included within the hollow of the various tubular members so as to make available at those connectors the appropriate communications and electrical power channels previously discussed in connection with FIG. 15a and the prior embodiments.

The frame mounted connectors serve as well as a support or base for the robotic arm. As illustrated, one of the arms 61 is connected by means of hand 64 to mating connector 91c. Fingers 65, 67 and 69, only two of which are visible in this figure, provide a grip on the connector to physically hold the end of the arm at that location. The opposite hand 63 on this arm is shown gripping a truss 95 that is being assembled using the assistance of a second manipulator arm. A second arm 61', as illustrated in the Figure, is connected to connector 91i in the same manner described for arm 61. The free right hand of arm 61' grips a tubular support member 97 and is shown moving that support member into a proper position for assembly within structure 95.

The operator remotely exercises the control circuits and controls the arms and its movement. That operator may observe the action directly or do so indirectly, such as by a combination of television camera and TV monitor, where the assembly operation is carried out at a location remote from the operator. This latter arrangement is particularly useful for assembling structures in outer space application. The assembly operations may be monitored on a television screen located in a distant space ship or from a receiving station on Earth, giving desired visual "feedback".

The embodiment of FIG. 16 illustrates only two manipulator arms. It is apparent that additional numbers of such manipulators may be included, the number depending upon the sophistication and capability of the control circuits and the operator's abilities to handle numerous arms proceeding simultaneously. Furthermore, two or more arms can be linked together hand to hand to provide a longer arm for special applications.

In the nature of a silkworm's movement, the arms are essentially self propelled and are moved under control from one location to another along structure 90. For example, this movement is pictorially illustrated in FIGS. 17a through 17c. In that figure, arm 61, which is shown attached to connector 91a as described in the preceding figure, is bent over in a loop configuration so that its other hand is aligned with and moves toward an adjacent connecting pad 91b. As this action continues under control of the operator, the right hand engages the appropriate pad or connector. That engagement couples the appropriate power and communications circuits from this end of the arm, duplicating the connection made by the left hand. The operator then disconnects the left hand, loosening the robot's grip and moves the arm upward off the left most pad such as depicted in FIG. 17c. This process may be repeated as represented by the dash lines in FIG. 17c in which case the left most connector or hand now moves to the third pad 91c. The arm thusly is ambulatory and moves along the structure, much like a silkworm in that movement.

A further refinement to the invention is a robotic arm that is essentially completely self-contained and does not require direct electrical contact by wire to a controlled source. Instead the arm may contain a self-contained power supply, such as a solar-powered rechargeable dc power cell, and commands may be self-contained within the arm, such as may be possible if the arm is to perform a repetitive task that does not change. Alternatively the arm receives control instructions via radio transmission.

Additional elements required to make the arm independent is illustrated pictorially in FIG. 18. Thus each disk contains a central controller or interface 100, a microprocessor chip 101, three semiconductor controlled power distribution systems 103, an RF command antenna 105 which is connected to the chip. The power and communication lines extend and electrically couple to the corresponding circuit elements of each of the other disks employed in the arm and which contain the same control circuitry. Each disk has one processor and three power distributors to the actuators. Each disk receives RF commands separately and any selected disk may control the entire arm.

In the event that any circuit fails on one disk sufficient redundancy exists that allows corresponding circuits on the other disks to take over and control the various actuators. As those skilled in the art recognize, this redundancy is important. Although it adds little to the weight of the arm it adds value particularly in those applications where the arm is used in a relatively inaccessible area where repair could be difficult, such as is the case in most outer space applications. Thus if a portion of an arm fails in an outer space application, physical repair is not necessary. One need not launch another space vehicle to retrieve and repair the arm, which would occasion great expense, but instead the redundant circuits in the arm allow it to continue its function. In effect, the arm is self-repairing.

To reduce the number of control leads required in the prior embodiment of FIG. 9, a multiplexing type of circuit provides a suitable alternative. Both time-division-multiplexing (TDM) and frequency-division-multiplexing (FDM) can be utilized.

A TDM control circuit is presented by way of example in FIG. 19a. Each of the three actuators 1-1, 1-2 and 1-3 is associated with a first disk, the actuators i-I, i-2 and i-3 associated with the "ith" disk and actuators n-1, n-2 and n-3 associated with the "nth" disk in the series are symbolically illustrated with the many intermediate disks omitted for clarity of this description. Each actuator has an electrical ground, a positive voltage terminal for activating the actuator in one direction and a negative voltage terminal for activating the actuator in the other or reverse direction. Five electrical leads extend through the disk passages, not illustrated, and are designated 111, Ground; 113, +V; 115, −V; 117, CLOCK; and 119, CONTROL. A control circuit 121 is associated with actuator i-1 and contains two semiconductor controlled switches, SCS, 123 and 125 and a processor decoder chip 127, all of which are conventional known electronic components. These SCSs are used as switches.

The anode of SCS 123 is connected to the positive voltage line and its cathode to the positive terminal of the associated actuator and the cathode of the second SCS 125 is connected to the negative voltage line and its anode to the negative terminal of the actuator. The gates of the two SCSs are connected to two respective outputs of the decoder chip and in turn two inputs of the decoder chip are connected to the clock and the control leads. For clarity the power supply leads to the decoder are omitted. Each of the gates is pulsed by the chip appropriately to turn the SCS off or turn it on. For those skilled in the art of circuit design, such switching circuitry is very common and standard.

The logic of switching the SCSs is shown in FIG. 19b. The clock signal line carries pulses at regular intervals, with periods on the order of micro-seconds to nano-seconds. This signal is used as a time-keeping reference for control commands. A control period is chosen such that the number of pulses within that period is equal to three times the number of actuators. The control signal line provides information to the chip regarding start and end of the control period. During this period any one or more of the actuators can be turned on in either direction or turned off by pulses arriving on the control line. For example, the three pulses for actuator il, shown in FIG. 19b, can be utilized as follows: If a pulse appears at time t1, the chip will turn on SCS 1 and turn off SCS 2; this will energize the actuator in one direction. If it appears at time t2, it will turn off SCS 1 and turn on SCS 2; this will energize the actuator in the opposite direction. If it appears at time t3, it will turn off both SCSs; this will stop the actuator and freeze it at that position. With the foregoing capability, it is possible to activate any or all of the actuators as desired. The shortest time between starting and stopping an actuator will be equal to the control period. For slow-turning actuators, so long as the control period is on the order of micro-or nano-seconds, this will be hardly perceptible.

The end disk position and orientation, and the shape of the "Flexidigit Robotic Manipulator", FRM, is uniquely determined by the displacements of the actuators. Closed-form mathematical solutions exist to evaluate the position, orientation and shape in terms of these displacements. If the actuators are powered by stepper motors (or solenoids), then the displacements are determined by the stepping commands (or by the binary positions) given to the stepper motors (or to the solenoids). However, if the actuators are driven by other drivers, then it is necessary to incorporate distance measuring sensors (such as spring-strain gage) to measure the displacements. The signals from these sensors, one for each actuator, are then used for feedback control of the actuators.

An example of the total control sequence and logic is presented in FIGS. 19c, 19d and 19e. The microprocessor in command of the FRM receives input in terms of the end disk position and orientation, and the shape of the FRM. The required actuator displacements, $R_{ij}$ ($i=1$ to 3 and $j=1$ to N) are computed and stored in memory. Then the measured actuator displacements, $M_{ij}$, are scanned and displacement errors, $E_{ij} = R_{ij} - M_{ij}$, are evaluated.

An ixj decision matrix $[D_{ij}]$ is then generated such that each of its elements $D_{ij}=1$, 2 or 3 depending on whether $E_{ij}$ is negative, positive or close to zero within a preset tolerance level, $\epsilon$, respectively. If $D_{ij}=1$, then the actuator (ij) is turned on such that the displacement increases, and if $D_{ij}=2$, the actuator is turned on such that its displacement decreases, and if $D_{ij}=3$, the actuator is turned off. After the decision matrix is evaluated, the clock is started and synchronized with this starting time, control pulses are sent on the control line at appropriate times depending on the values of the elements $D_{ij}$.

An example of a 3×4 decision matrix for an FRM with four disk pairs is shown in FIG. 19d. Here, $D^{\circ}$ represents an initial arbitrary condition, and $D^{\infty}$ represents the final condition. The corresponding pulse trains on the control line are also shown in FIG. 19d. At the end of the control period the clock is stopped and the scanning of the measured displacements is resumed. This logic continues as an endless closed loop. After the FRM reaches the desired shape and orientation, the decision matrix elements would all be the number 3 and all actuators would be turned off. FIG. 19e represents a block diagram for the logic just described for a "closed loop" system.

The mode of operation of the control sequence and logic presented in FIGS. 19c through 19e is the same for the "open loop" system embodiment that does not contain the electronic feedback sensors. However, absent electronic feedback provided by the sensors of the embodiment earlier described, the feedback is visual; the operator observes the end position of the arm and operates the controls accordingly to change the arm's end position. The flow chart in that instance is modified and does not include the electronic feedback; the computer program does not need to perform the calculation or make the measurement. The input supplied by the operator is the position information, such as by a joystick that in effect supplies the necessary data to tell the processor to move the end up a bit, backward a bit, to the right, etc.

As earlier described, the control circuit may be the simplest form of user operated switches; ones manipulated on and off by a person. That is the crudest form of control and as the reader appreciates, that form of control is not practical in the more sophisticated tasks described. The control is preferably accomplished automatically by programmed processors.

An FDM control circuit is presented by way of example in FIG. 20. Here, the actuators and the SCSs are similar in concept to those in FIG. 19. However, the control of the actuators is accomplished by FDM, which offers the advantage of simultaneous control of all actuators. The FDM technique is well-known and its implementation is easily achieved by those well versed in the art of designing electronics hardware. For each actuator a unique command signal frequency band is assigned for carrying information on its control. The 3 N bands for the 3 N actuators are chosen to form a contiguous band of frequencies. This sub-carrier frequency band is modulated on a significantly higher carrier frequency, fo. This constitutes the single command signal which can be either hardwired or transmitted wireless. This signal is received and the individual subcarrier frequencies are separated by the FM discriminator. The output from this is fed to each circuitry aligned to its specific actuator. Each of these circuits consists of a baseband filter which selects the particular frequency band, which in turn is demodulated for control of the SCSs.

Several other control concepts are possible, some of which are delineated below. For those well versed in the art of computer hardware and software development, practical implementation of these concepts are within the realm of current knowledge and technology. Hence the concepts are described at the block diagram levels only.

Various open and closed loop systems are presented. FIG. 21 illustrates an open-loop control configuration. Here, the operator visually observes the FRM and controls its shape, position and orientation by inputting commands on actuator positions using the computer keyboard. The hardware includes a computer 21-1 with its associated keyboard 21-3, an interface 21-5 to translate the computer output to an actuator controller, and the controller 21-7 which receives commands from the interface and controls the actuators in the FRM. The FRM's position is available to the operator as visual feedback represented at block 21-8. The software 21-2 programmed into the computer memory can be written in any one of the programming languages currently available, such as Fortran, Basic, Pascal, and M/C Lang.

FIG. 22 illustrates a closed-loop configuration, which is more sophisticated than the open loop. It contains the computer or other processor 22-1, keyboard 22-3, software or firmware 22-2, interface 22-5, and controller 22-7, which elements serve the same functions described in connection with FIG. 21. In this, the actuator positions are measured by the displacement sensors; these signals are translated by the interface which communicates the displacement information back to the computer. The keyboard input in this case is not the actuator positions, but is an input that specifies the required shape, end positions and orientation, rate of motion of individual disks, etc. The software in this case being a higher level language, is larger and more sophisticated. The programming may be accomplished in any available programming language, examples of which were given for FIG. 21. This software compares the input requirements with the feedback signals, and then provides the appropriate commands to the FRM actuators. The visual feedback to the operator is valuable only to allow the operator to decide whether to change the input conditions.

Figure 23:
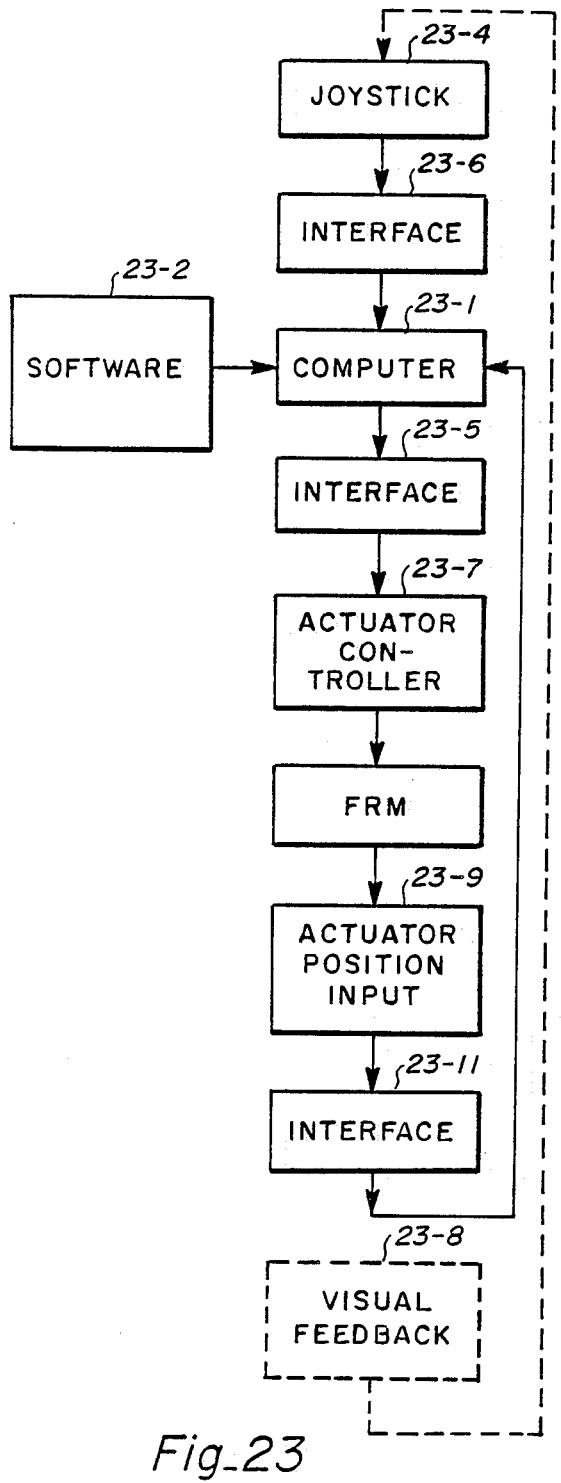

FIG. 23 illustrates a block diagram for a system similar to that in FIG. 22. Instead of a keyboard input, however, a three dimensional joystick is used as represented by block 234. The joystick is fashioned in the same structure as the FRM. In this control arrangement, the FRM mimics the shape, end position and orientation of the joystick. Signals from the joystick are input into the computer by an interface 23-6. The visual feedback, 23-8, allows the operator to check and correct the FRM status.

Figure 24:
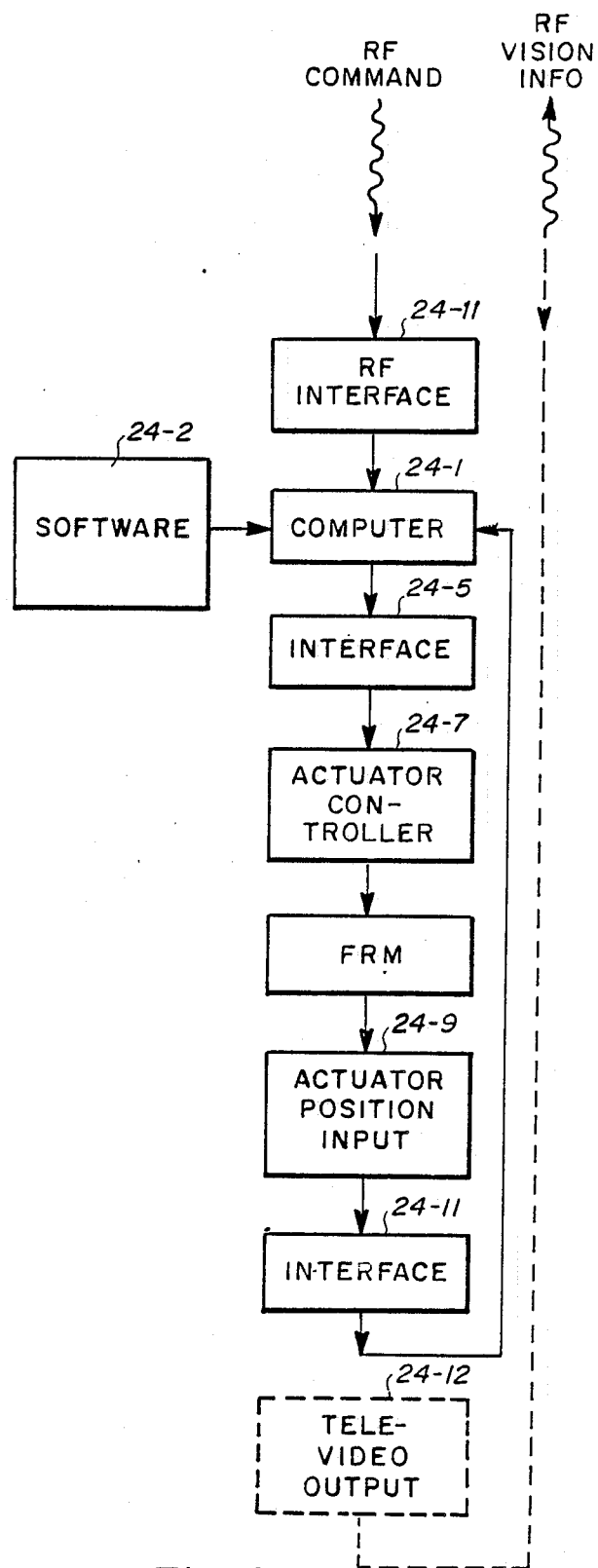

The concept shown in FIG. 22 is extrapolated to remote operation and control in the arrangement of FIG. 24. Here, the keyboard of the arrangement of FIG. 22 is replaced by a radio frequency or RF interface, 24-11, which receives the specified position commands over an RF command signal, an RF "link", and translates the commands into appropriate input to the computer. The resulting status of the FRM is transmitted back to the command station by televideo as represented in block 24-12. The rest of the operation is the same as in FIG. 22.

Instead of using one master computer to control the FRM, another method would be to use distributed processors, one for each disk pair in the FRM, as illustrated in FIG. 25. Here, each disk pair has its own microprocessor $\mu p1$ through $\mu pN$, which commands its own disk controller, 25-7.1 through 25-7.N, and the disk controllers in turn operate the three actuators of the FRM arm section, d1 through dN. The position signals from these actuators supplied by installed position sensors 25-9.1 through 25-9.N are fed back to the microprocessor via an interface, 25-10.1 through 25-10.N. As such, the Control unit for each disk pair has its own feedback control, and the master computer 25-1 commands the microprocessor in each disk pair to position its actuators to the required displacements. The software 25-2 residing in the master computer in this alternative is simpler than that in the preceding arrangement, since much of the decision making is effectively delegated to the microprocessors. The visual feedback 25-8 in this case provides information on changes in the input as required.

FIG. 26 illustrates another configuration for remote operation with self-repairing capability. The architecture here is compatible with the hardware for the arm sections illustrated in FIG. 18. This includes RF interfaces 26-11.1 through 26-11.N, which are essentially identical and each is coupled to an associated one of the procesors designated $\mu p1$ through $\mu pN$, the outputs of which are coupled to control paths to all disk controllers in the FRM, 26-7.1 through 26-7.N. Here, each microprocessor is capable of controlling all arm actuators. At any instant of time, however, only one of the many microprocessors is enabled. The others are disabled by the RF command. The displacement signals from the actuators are outputted by interface 26-10 and are transmitted back by RF to the command post, either ground or space-borne, by the RF interface. The televideo output 26-12 is used for visual observation and correction. In this configuration, the feedback information is used by the computer located at the command, not shown in FIG. 26. And that information is processed in the manner described in the prior embodiments while further commands are issued as required.

The most sophisticated and advanced control system is Artificial-Intelligence-based autonomous configuration illustrated in FIG. 27. Here, a visual feedback is directly input into computer 27-1 by the video-interface combination 27-12 and 27-13. The keyboard, 27-3, input to the computer would be a task, such as "pick up object on the table and move it 3 feet in northwest direction". This system involves pattern recognition of the video output, and rule-based, domain-constrained software. Software capable of accomplishing such intelligent tasks, called "Expert Systems", can be developed. One higher order language used today is LISP. The software is highly sophisticated and complex since numerous decisions have to be made in implementing the task. Nonetheless, the arrangement is feasible and within the realm of existing technology.

The present invention is not directed to or concerned directly with the details of programming, a subject which is left to skilled technicians, the programmers, who given the objectives and the functions that the computer is to perform as herein algorithmically described may develop suitable source codes for selected computers.

In the preceding description reference has been made to position information. It is understood that such information includes within its scope temporal position information, that is information not only on the position to be attained, but the rate or speed with which it is to attain that position. Within the scope of choice, the apparatus allows the operator the flexibility of moving some arm sections more quickly than others.

It is believed that the foregoing description of the preferred embodiments of the invention is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. A manipulator comprising:
a robotic arm, said arm comprising:
   (a) at least two ends; and
   (b) an arm actuator means for positioning the ends in a plurality of positions relative to each other;
each end comprising a plurality of fingers forming a hand;
each finger comprising:
   (a) a base end;
   (b) a free end; and
   (c) a finger actuator means for positioning the free end relative to the base end.

2. The invention as defined in claim 1 wherein each of said arm and said fingers include control means coupled in circuit with each of said actuator means for selectively positioning said arm and fingers responsive to position information supplied to said control means.

3. The invention as defined in claim 2, wherein each of said two arm ends each includes: coupling means for coupling control signals from an external source to said control means, said coupling means being adapted to mate with mating coupling means associated with said external source.

4. The invention as defined in claim 2 wherein each of said two arms ends each includes: coupling means for coupling position information signals from an external source to said control means, said coupling means being adapted to mate with a coupling means external of said arm.

5. The invention as defined in claim 4 wherein said coupling means includes at least one of the following types of energy connecting devices: an electrical energy connector, light energy connector and thermal energy connector.

6. The invention as defined in claim 4 wherein said coupling means includes: split transformer means, said split transformer means being capable of inductively coupling alternating current power responsive to mating engagement with a mating split portion of a transformer, having a transformer winding coupled in circuit with a source of ac current.

7. The invention as defined in claim 4 wherein said coupling means is located central of said arm end and wherein said plurality of fingers are spaced about a peripheral wall thereof; said fingers being adapted to grip the peripheral wall of an external mating coupling means.

8. The invention as defined in claim 2 further comprising: RF receiver means, said receiver means being coupled in circuit with said control means, for receiving position information signals transmitted as an RF signal from a remote source and coupling said signals to said control means.

9. The invention as defined in claim 8 further comprising: power supply means located within said arm for supplying power to said control means and to said RF receiver means, said power supply means being a dc type power supply.

10. The invention as defined in claim 2 wherein said control means contains microprocessor means; said microprocessor means including: program means for selectively energizing said actuators to cause said arm end to attain a predetermined position relative to the other end.

11. The invention as defined in claim 2 wherein each of said control means includes microprocessor means; each of said microprocessor means being capable of supplying control signals to each of said actuator means; protocol means for establishing a priority protocol amongst said microprocessor means for permitting only one of said microprocessor means to supply control signals to said actuator means; said protocol means responsive to the disablement of said microprocessor means for enabling another of said microprocessor means to supply control signals to said actuator means.

12. The invention as defined in claim 11 further comprising: RF receiver means, said receiver means being coupled in circuit with said control means, for receiving position information signals transmitted as an RF signal from a remote source and coupling said signals to said control means.

13. The invention as defined in claim 1 further comprising: power supply means located within said arm for supplying power to said arm actuator means and said finger actuator means.

14. The invention as defined in claim 1 further comprising: programmed microprocessor means carried within said arm for selectively controlling said arm actuator means and said finger actuator means.

15. The invention as defined in claim 1, further comprising:
control circuit means for controlling said arm and finger actuator means; said control circuit means being located externally of said arm;
connector means;
support conduit means for coupling electrical control circuit signals between said connector means and said control circuit means;
each of said two arms ends including coupling means for coupling control signals into said arm;
said connector means being adapted to mate with said coupling means for coupling control signals therebetween;
said connector means having a gripable surface to permit said fingers to hold the associated coupling means in mating engagement with said connector means.

16. A system for assembling a two or three dimensional structure comprising in combination:
a plurality of structural members; at least one of said structural members containing: support mounted connector means; and electrical lead means located internally of said structural member for coupling control signals and a source of electrical power to said support mounted connector means;
at least one manipulator with said manipulator comprising: a robotic arm, said arm comprising:

(a) at least two ends; and
(b) an arm actuator means for positioning the ends in a plurality of positions relative to each other;

each end comprising a plurality of fingers forming a hand; each finger comprising:
(a) a base end;
(b) a free end; and
(c) a finger actuator means for positioning the free end relative to the base end;

electrical control circuit means coupled in circuit with each of said arm actuator means and finger actuator means for selectively positioning said arm and fingers responsive to position information supplied to said control circuit means;

each of said formed hands further including: coupling means for coupling position information signals from an external source to said electrical control circuit means, said coupling means being adapted to mate with said support mounted connector means; and said support mounted connector means including a grip surface, whereby said plurality of fingers in a respective one of said formed hands is positionable to grip and hold said grip surface to form a coupling therebetween and mate said coupling means to said support mounted connector means.

17. The invention as defined in claim 16 wherein said coupling means includes: electrical, thermal and optical connectors.

18. The invention as defined in claim 16 wherein said coupling means includes: split transformer means, said split transformer means being capable of inductively coupling alternating current power responsive to mating engagement with a mating split portion of a transformer having a transformer winding coupled in circuit with a source of ac current.

19. The invention as defined in claim 16 further comprising:
RF receiver means, said receiver means being located within said robotic arm and being coupled in circuit with said control circuit means, for receiving temporal position information signals transmitted as an RF signal from a remote source and coupling said signals to said control circuit means.

20. The invention as defined in claim 16, further comprising: main computer means for supplying information signals to said electrical control circuit means; and wherein each said robotic arm and fingers comprise a plurality of sections and wherein said electrical control circuit means includes a plurality of portions with a respective portion thereof located in a corresponding one of said sections of said robotic arm and fingers; and wherein each said portion includes:

microprocessor means having at least one input; said microprocessor means for interpreting information signals sent by said main computer means and providing output signals representative of orientation and position for the respective section;

actuator controller means; said actuator controller means for translating said output signals of said microprocessor means to a form for energizing the respective arm and finger actuator means associated with said respective section;

sensor means; said sensor means for providing an output representative of the position and orientation of said respective associated arm and finger sections;

interface means; said interface means coupled to said sensor means for providing position information to an input of said microprocessor means responsive to signals supplied by said sensor means; and wherein said associated microprocessor means is responsive to information supplied by said interface means for providing signals representative of deenergization of the associated actuator means responsive to said sensor means detecting attainment of the desired relative position of said section.

21. The invention as defined in claim 20 further comprising: RF communications system means for wireless transmission and reception of information signals between said main computer means and said electrical control circuit means.

22. The invention as defined in claim 21 wherein said RF communication system means includes: RF transmitter means and RF receiver means located in said robotic arm for transmitting and receiving, respectively control information.

* * * * *